US012601891B2

(12) United States Patent
Fan et al.

(10) Patent No.: US 12,601,891 B2
(45) Date of Patent: Apr. 14, 2026

(54) OPTICAL ELEMENT DRIVING MECHANISM

(71) Applicant: Actutek Corporation, Taoyuan City (TW)

(72) Inventors: Chen-Hsien Fan, Taoyuan City (TW); Sin-Jhong Song, Taoyuan City (TW); Chih-Wen Chiang, Taoyuan City (TW); Chia-Che Wu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 681 days.

(21) Appl. No.: 17/740,667

(22) Filed: May 10, 2022

(65) Prior Publication Data

US 2022/0357588 A1 Nov. 10, 2022

Related U.S. Application Data

(60) Provisional application No. 63/186,496, filed on May 10, 2021.

(51) Int. Cl.

| | |
|---|---|
| *G02B 27/64* | (2006.01) |
| *G02B 7/00* | (2021.01) |
| *G02B 7/02* | (2021.01) |
| *G02B 7/08* | (2021.01) |
| *G02B 7/09* | (2021.01) |
| *G02B 15/14* | (2006.01) |
| *G03B 3/10* | (2021.01) |
| *G03B 5/02* | (2021.01) |
| *H04N 23/54* | (2023.01) |
| *H04N 23/55* | (2023.01) |

(52) U.S. Cl.
CPC .............. *G02B 7/08* (2013.01); *G02B 7/005* (2013.01); *G02B 7/021* (2013.01); *G02B 7/022* (2013.01); *G02B 7/023* (2013.01);

*G02B 7/09* (2013.01); *G02B 15/142* (2019.08); *G02B 27/646* (2013.01); *G03B 3/10* (2013.01); *G03B 5/02* (2013.01); *H04N 23/54* (2023.01); *H04N 23/55* (2023.01); *G03B 2205/0061* (2013.01)

(58) Field of Classification Search
CPC .......... G02B 7/00; G02B 15/00; G02B 27/00; G03B 3/00; G03B 5/00; G03B 2205/00; H04N 23/00
USPC ........................................................ 359/822
See application file for complete search history.

(56) References Cited

U.S. PATENT DOCUMENTS

| | | | |
|---|---|---|---|
| 2015/0277138 A1* | 10/2015 | Yanagisawa | ............. G03B 5/00 359/554 |
| 2021/0029280 A1* | 1/2021 | Kim | ....................... G03B 17/12 |

FOREIGN PATENT DOCUMENTS

| | | |
|---|---|---|
| CN | 102854595 A | 1/2013 |
| CN | 110999267 A | 4/2020 |

OTHER PUBLICATIONS

An Office Action in corresponding CN Application No. 202210508607.5 issued on Jul. 16, 2025 is attached, 4 pages.

* cited by examiner

*Primary Examiner* — Bumsuk Won
*Assistant Examiner* — Grant A Gagnon
(74) *Attorney, Agent, or Firm* — MUNCY, GEISSLER, OLDS & LOWE, P.C.

(57) ABSTRACT

An optical system is provided. The optical system includes a first assembly and a second assembly. The first assembly includes a first welding portion. The second assembly is affixed on the first assembly and includes a second welding portion. The first welding portion is affixed on the second welding portion by welding.

20 Claims, 22 Drawing Sheets

1000

1000

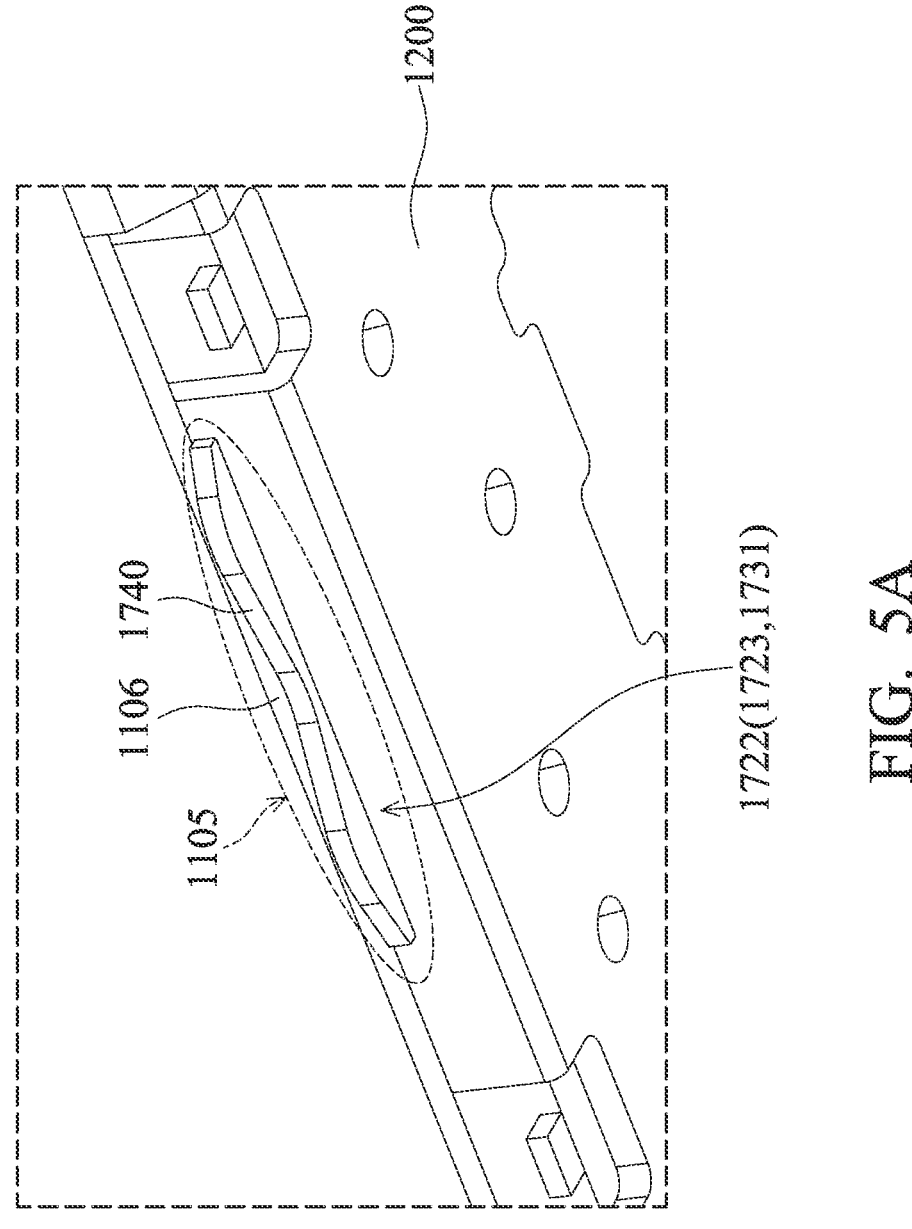
1200
1106 1740
1105
1722(1723,1731)
FIG. 5A
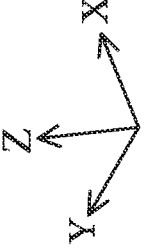
X
Z
Y

OPTICAL ELEMENT DRIVING MECHANISM

CROSS REFERENCE TO RELATED APPLICATIONS

This application claims the benefit of U.S. Provisional Application No. 63/186,496, filed on May 10, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modem electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical system is provided. The optical system includes a first assembly and a second assembly. The first assembly includes a first welding portion. The second assembly is affixed on the first assembly and includes a second welding portion. The first welding portion is affixed on the second welding portion by welding.

In some embodiments, the second assembly further comprises a bottom comprises non-metal material and a circuit assembly disposed in the bottom. The circuit assembly includes a first circuit element disposed in the bottom, a second circuit element disposed in the bottom, wherein the second welding portion is a part of the second circuit element, and a third circuit element disposed in the bottom.

In some embodiments, the first circuit element and the second circuit element are electrically isolated from each other. The first circuit element and the third circuit element are electrically isolated from each other. The first welding portion comprises a first welding surface. The second welding portion comprises a second welding surface. The first welding surface and the second welding surface are perpendicular.

In some embodiments, the second welding portion is not exposed from the first assembly when viewed in a first direction parallel to a normal vector of the first welding surface. The second welding portion overlaps the first assembly when viewed in a second direction opposite from the first direction. The first circuit element comprises a first main body, a bending portion, and a first connecting portion.

In some embodiments, the optical system further includes a first electronic element and a second electronic element connecting the first main body. The first main body connects to the first connecting portion through the bending portion. The first connecting portion is exposed from the bottom.

In some embodiments, the second circuit element further comprise a third welding portion affixed on the first welding portion by welding. The third circuit element further comprise a fourth welding portion affixed on the first welding portion by welding. The second welding portion and the third welding portion are arranged in a third direction. The second welding portion and the fourth welding portion are arranged in a fourth direction. The third direction and the first direction are different. The fourth direction and the first direction are different. The third direction and the fourth direction are different. The second welding surface is not parallel or perpendicular to the third direction. The second welding surface is not parallel or perpendicular to the fourth direction.

In some embodiments, the first direction and the third direction are perpendicular. The first direction and the fourth direction are perpendicular. The third direction and the fourth direction are perpendicular. the second welding portion comprises a first portion, a second portion, a third portion, and a heat isolation structure. The first portion connects to the third portion through the second portion. The second welding surface is at the first portion. The first portion is exposed from the bottom when viewed in the second direction. A portion of the second portion is exposed from the bottom when viewed in the second direction. Another portion of the second portion is embedded in the bottom when viewed in the second direction.

In some embodiments, the third portion is embedded in the bottom when viewed in the second direction. The heat isolation structure and the second portion are arranged in the fourth direction. The first welding surface is exposed form the heat isolation structure when viewed in the second direction. The second portion has a first width in the fourth direction. The heat isolation structure has a second width in the fourth direction. The first width and the second width are different.

In some embodiments, the first width is less than the second width. A first distance is between the first main body and a bottom surface of the bottom in the first direction. A second distance is between the first connecting portion and the bottom surface in the first direction. A third distance is between the third welding portion and the bottom surface in the first direction the first distance and the second distance are different. The first distance and the third distance are different. The second distance and the third distance are different.

In some embodiments, the first assembly further comprises a case, wherein the first welding portion is a portion of the case. The bending portion is separated from the case. The bending portion is embedded in the bottom.

In some embodiments, the first connecting portion and the fourth welding portion are arranged in the third direction. A fourth distance is between the first connecting portion and the fourth welding portion in the third direction. A fifth distance is between the second welding portion and the third welding portion in the third direction. The fourth distance and the fifth distance are different.

In some embodiments, a sixth distance is between the first connecting portion and the third welding portion in the fourth direction. A seventh distance is between the second welding portion and the fourth welding portion in the fourth direction. The sixth distance and the seventh distance are different.

In some embodiments, the first distance is less than the second distance. The first distance is less than the third distance. The second distance is less than the third distance. The fourth distance is greater than the fifth distance. The sixth distance is greater than the seventh distance.

In some embodiments, the bottom comprises a main body and a wall. The wall extends from the main body in the second direction. The circuit assembly is disposed in the main body. A column is formed on the wall and extending in the third direction. The column is exposed from the first assembly when viewed in the first direction. The column is exposed from the first assembly when viewed in the third direction.

In some embodiments, the case further comprises a recess. The column is disposed in the recess. The first connecting portion is exposed from the first assembly when viewed in the first direction. The column does not overlap the first connecting portion viewed in the first direction.

In some embodiments, the first circuit element is electrically isolated from the first assembly. The first circuit element further comprises a second connecting portion disposed on the wall. The second connecting portion is exposed from the wall and overlaps the wall when viewed in the fourth direction. The second connecting portion extends in the second direction.

In some embodiments, at least a portion of the first circuit element overlaps the first electronic element when viewed in the first direction. At least a portion of the first circuit element overlaps the second electronic element when viewed in the first direction. At least a portion of the first connecting portion overlaps the first electronic element when viewed in the third direction. At least a portion of the first connecting portion overlaps the second electronic element when viewed in the third direction. The first electronic element and the second electronic element do not overlap each other when viewed in the third direction. The third welding portion does not overlap the first electronic element and the second electronic element. At least a portion of the first connecting portion overlaps the second connecting portion when viewed in the third direction. The second connecting portion and the third welding portion do not overlap each other when viewed in the third direction.

In some embodiments, at least a portion of the first electronic element overlaps the second electronic element when viewed in the fourth direction. The first connecting portion does not overlap the first electronic element when viewed in the fourth direction. The first connecting portion does not overlap the second electronic element when viewed in the fourth direction. The first connecting portion and the second connecting portion do not overlap each other when viewed in the fourth direction. At least a portion of the second connecting portion overlaps the third welding portion when viewed in the fourth direction. The materials of the first welding portion and the second welding portion are different.

In some embodiments, the optical system further includes a first welding element covering the first welding surface, and a second welding element covering the second welding surface. The materials of the first welding element and the first welding portion are different. The materials of the second welding element and the second welding portion are different.

In some embodiments, the first assembly and the second assembly form a fixed portion. The optical system further comprises a movable portion disposed in the fixed portion and used for holding an optical element, a driving assembly disposed on the movable portion and the fixed portion and used for driving the movable portion to move relative to the fixed portion, and a resilient assembly elastically connecting to the movable portion and the fixed portion. The movable portion is movable relative to the fixed portion.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 5A and FIG. 5B are enlarged views of the second assembly viewed in different directions.

DETAILED DESCRIPTION OF THE INVENTION

Figure 1:
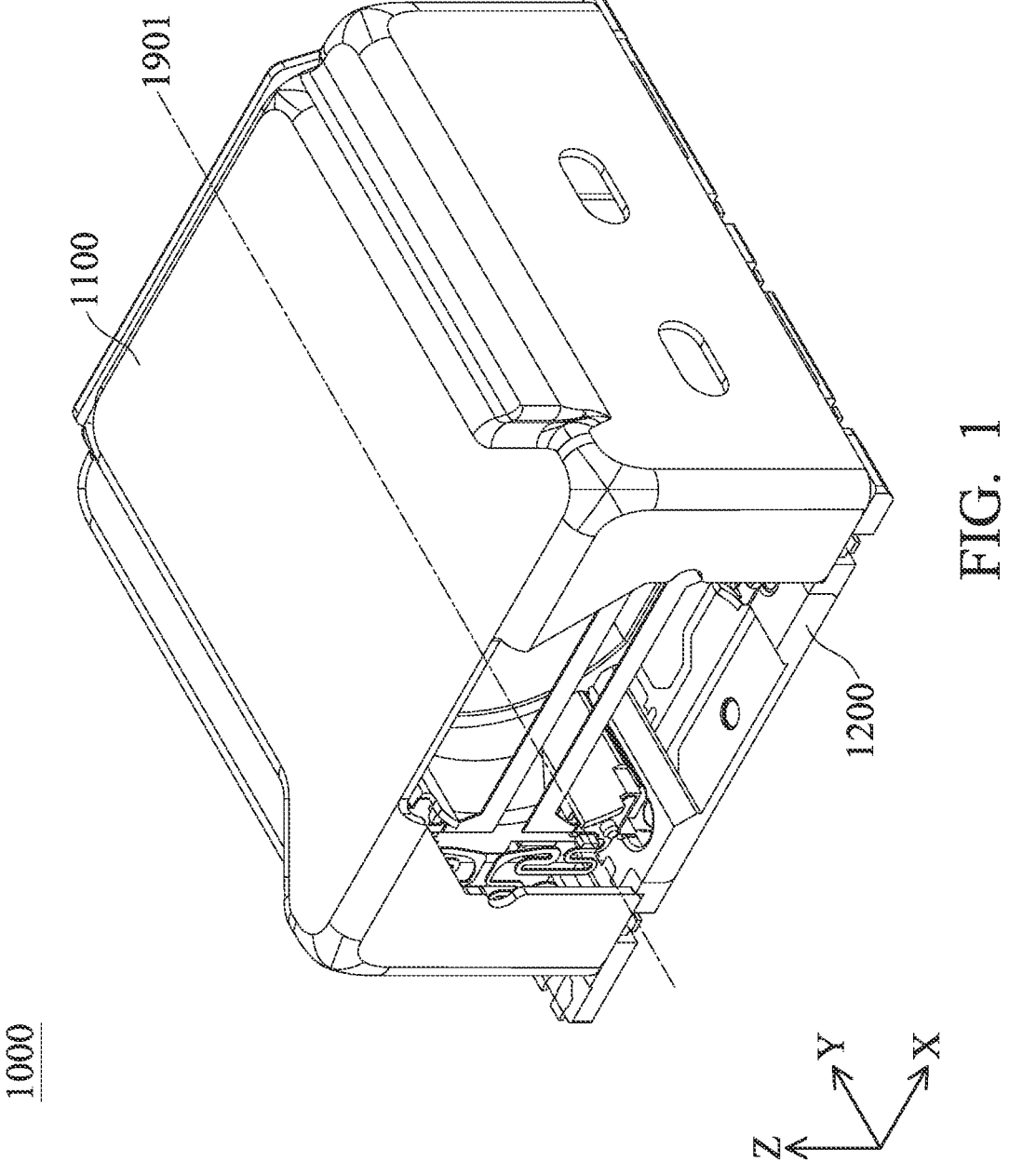
FIG. 1 is a schematic view of an optical system in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
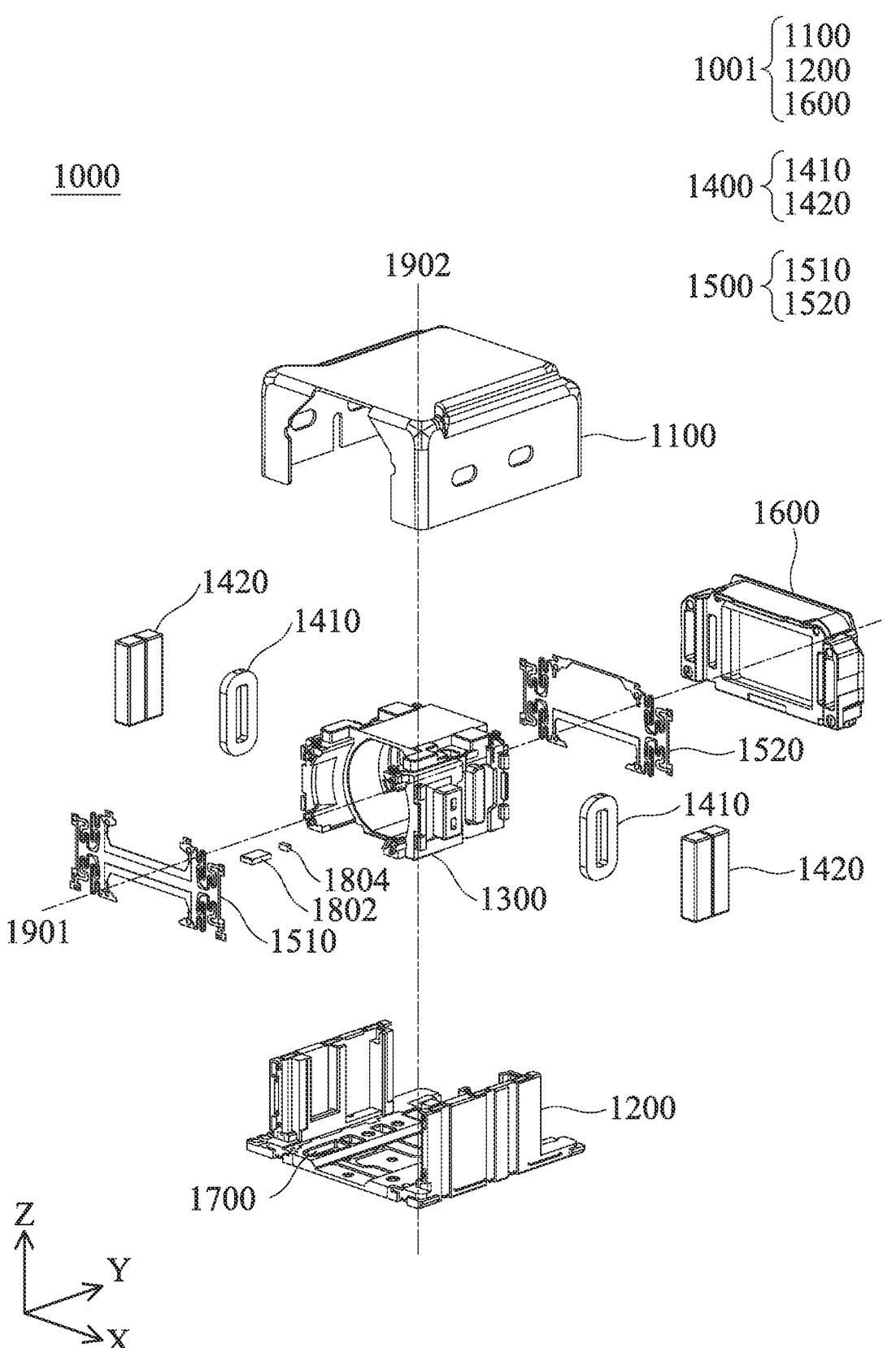
FIG. 2 is an exploded view of the optical system.
Figure 3A:
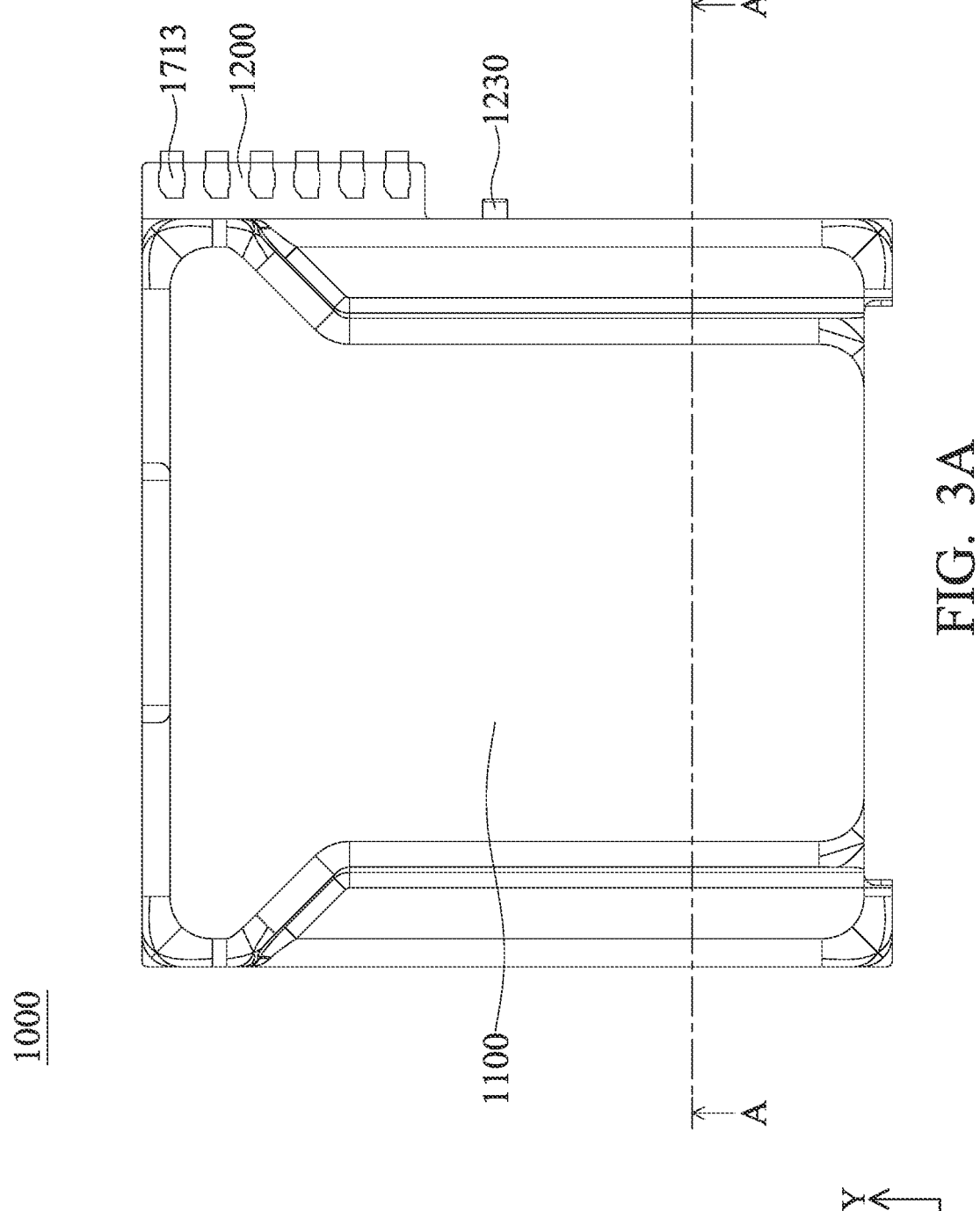
FIG. 3A is a top view of some elements of the optical system.
Figure 3B:
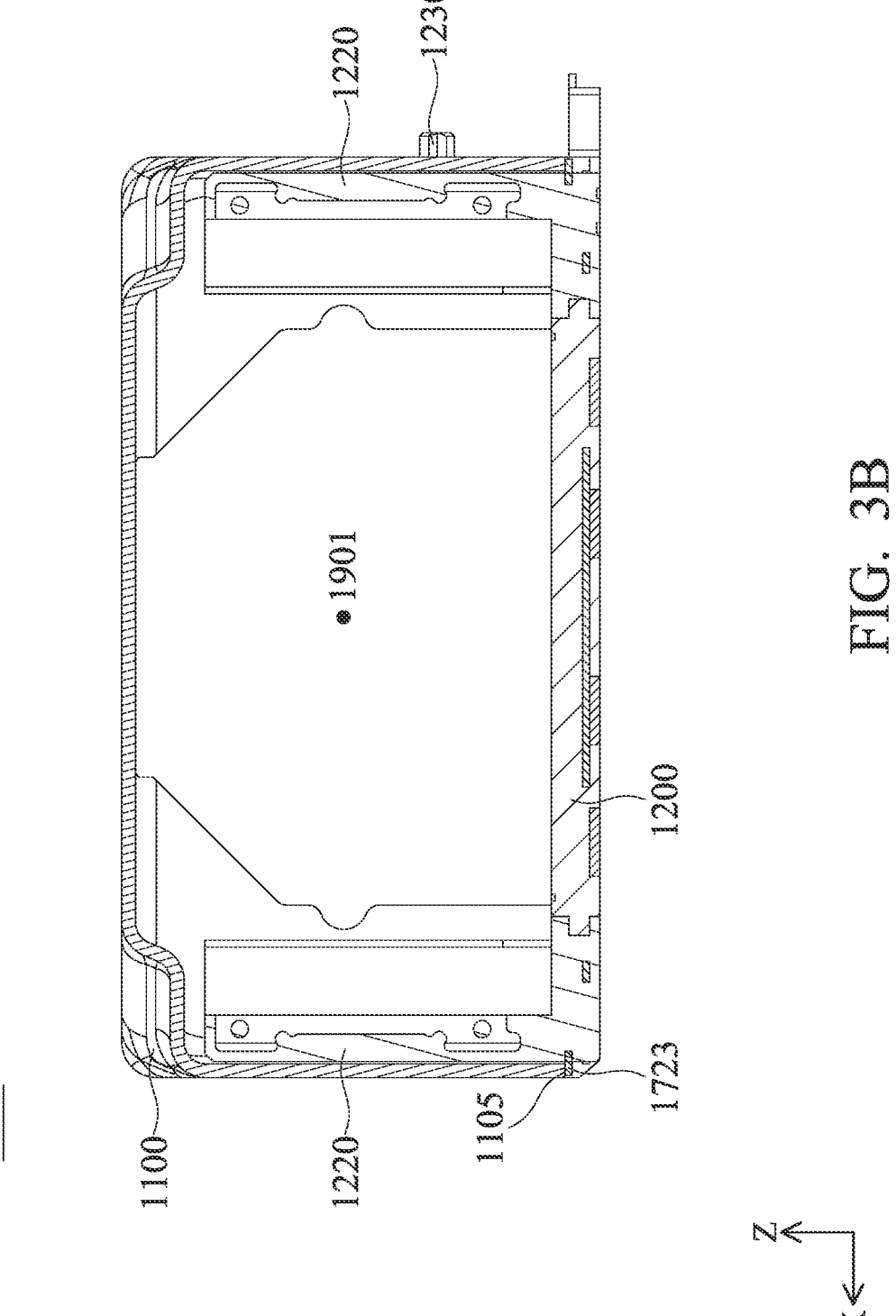
FIG. 3B is a cross-sectional view illustrated along the line A-A in FIG. 3A.
Figure 3C:
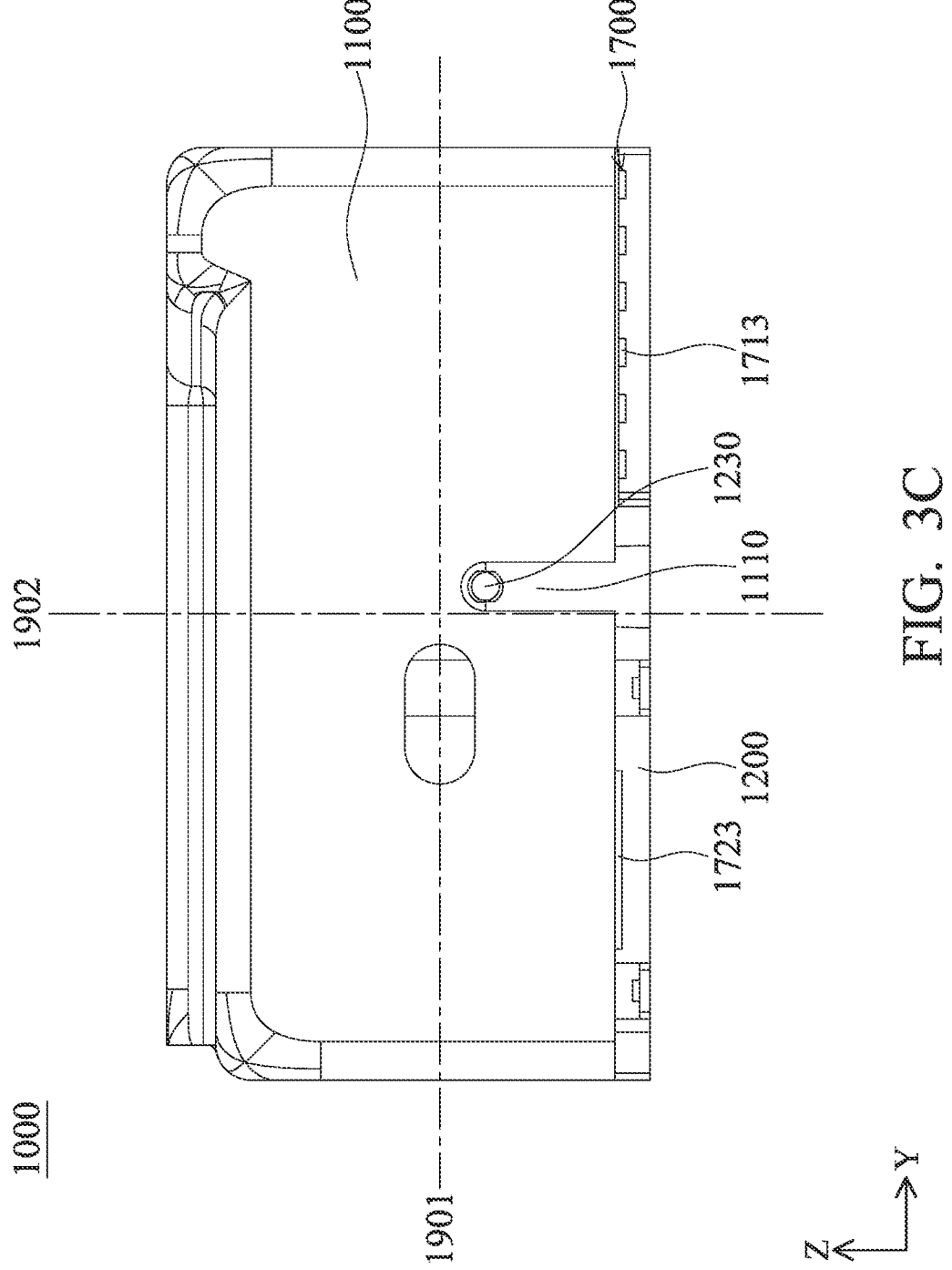
FIG. 3C is a side view of some elements of the optical system.
Figure 3D:
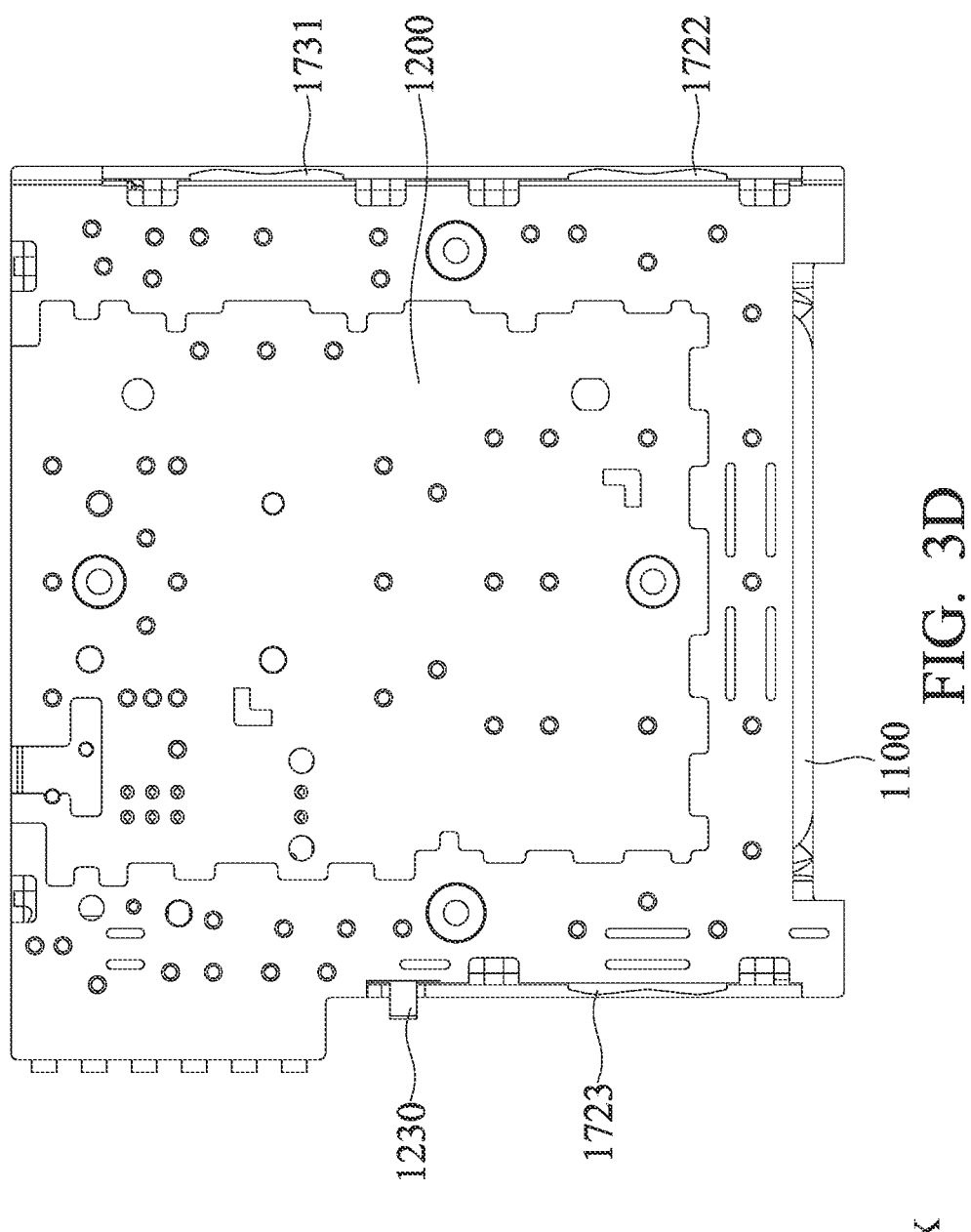
FIG. 3D is a bottom view of some elements of the optical system.

An optical system used for holding an optical element is provided in some embodiments of the present disclosure. For example, FIG. 1 is a schematic view of an optical system 1000 in some embodiments of the present disclosure. FIG. 2 is an exploded view of the optical system 1000. FIG. 3A is a top view of some elements of the optical system 1000. FIG. 3B is a cross-sectional view illustrated along the line A-A in FIG. 3A. FIG. 3C is a side view of some elements of the optical system 1000. FIG. 3D is a bottom view of some elements of the optical system 1000. The elements except for the case 1100, the bottom 1200, and the circuit assembly 1700 are omitted for simplicity.

As shown in FIG. 1 to FIG. 3D, the optical system 1000 may mainly include a case 1100, a bottom 1200, a movable portion 1300, a first driving element 1410, a second driving element 1420, a first resilient element 1510, a second resilient element 1520, a frame 1600, a circuit assembly 1700, a first electronic element 1802, and a second electronic element 1804. The movable portion 1300 and the frame 1600 may arrange along a first main axis 1901, and the case 1100 and the bottom 1200 may arrange along a second main axis 1902.

In some elements, the case 1100, the bottom 1200, and the frame 1600 may be called as a fixed portion 1001. The first driving element 1410 and the second driving element 1420 may be called as a driving assembly 1400. The first resilient element 1510 and the second resilient element 1520 may be called as a resilient assembly 1500. The movable portion 1300 may be disposed in the fixed portion 1001 used for holding an optical element (not shown). The movable portion 1300 may move with the optical element relative to the fixed portion 1001 to achieve optical image stabilization (OIS) or auto focus (AF).

The optical element may be, for example, a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the driving assembly 1400 is disposed on the movable portion 1300 and the fixed portion 1001 to drive the movable portion 1300 moving relative to the fixed portion 1001. For example, the first driving element 1410 may be a coil, and the second driving element 1420 may be a magnet. The first driving element 1410 and the second driving element 1420 may be disposed on the movable portion 1300 and the fixed portion 1001, respectively, or their positions may be interchanged, depending on design requirement. In some embodiments, the movable portion 1300 may be elastically connected to the fixed portion 1001 and suspended in the fixed portion 1001 by the first resilient element 1510 and the second resilient element 1520 made from metal (e.g. the movable portion 1300 may connect to the bottom 1200 and the frame 1600 by the first resilient element 1510 and the second resilient element 1520). For example, the first resilient element 1510 and the second resilient element 1520 may be disposed on opposite sides of the movable portion 1300. When current is passed through the first driving element 1410, an electromagnetic driving force may be generated between the first driving element 1410 and the second driving element 1420 to move movable portion 1300 and the optical element moving relative to the fixed portion 1001 to achieve auto focus or optical image stabilization. In some embodiments, the driving assembly 1400 also may include other driving elements, such as piezoelectric elements or shape memory alloys.

In some embodiments, the circuit assembly 1700 may be disposed in the bottom 1200, and the circuit assembly 1700 may be electrically connected to other electronic elements disposed inside or outside the optical system 1000, such as the first driving element 1410, the first electronic element 1802, and the second electronic element 1804, to achieve auto focus or optical image stabilization. The first electronic element 1802 and the second electronic element 1804 may be position sensors, which may be disposed on the bottom 1200 for detecting the position of the movable portion 1300 relative to the bottom 1200. For example, the first electronic element 1802 and the second electronic element 1804 may include a Hall sensor, a magnetoresistance effect sensor (MR sensor), a giant magnetoresistance effect sensor (GMR sensor), a tunneling magnetoresistance effect sensor (TMR sensor), or a fluxgate sensor. In some embodiments, the first electronic element 1802 and the second electronic element 1804 also may include a driving integrated circuit (IC) element.

Figure 4A:
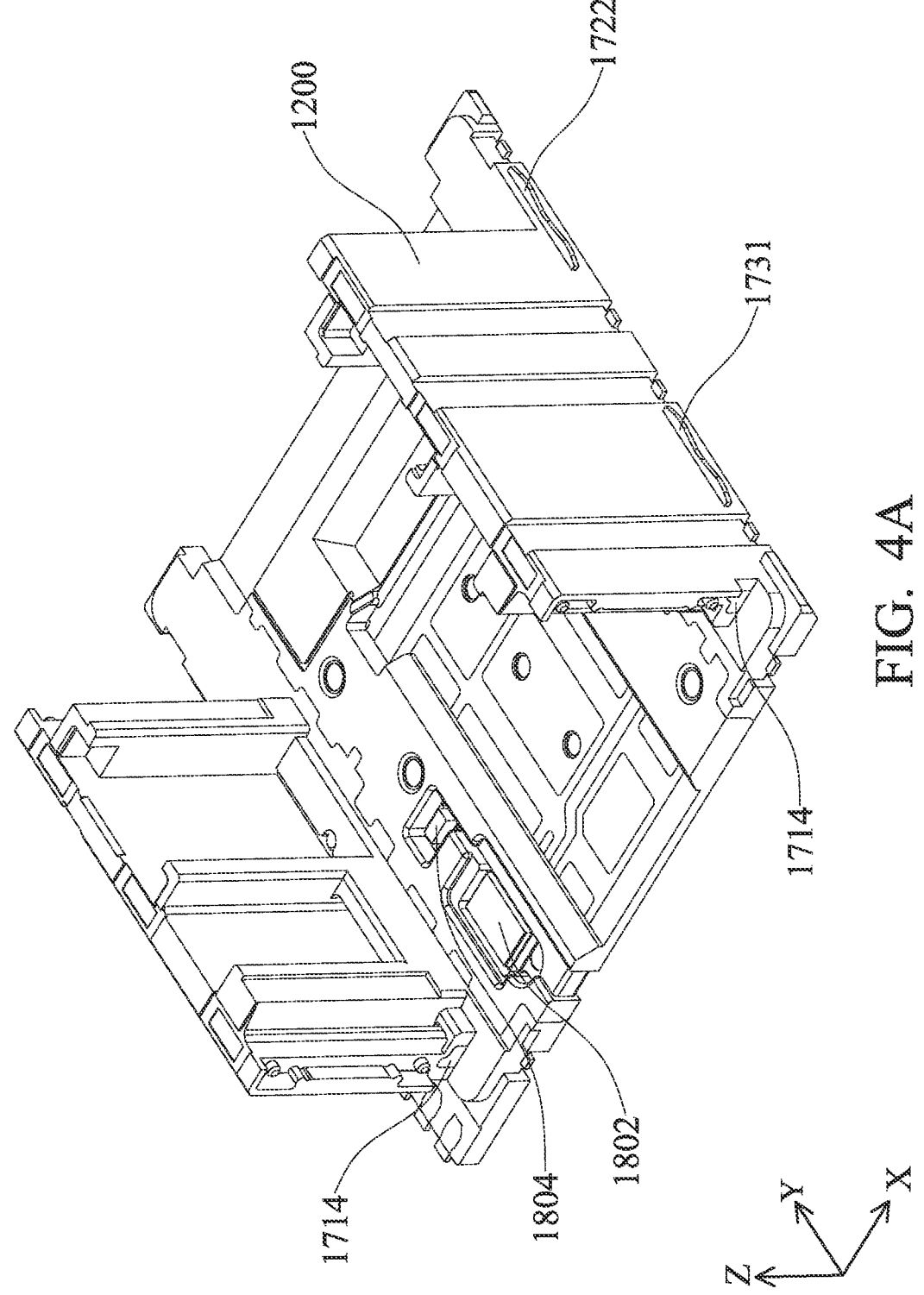
FIG. 4A is a schematic view of the second assembly.
Figure 4B:
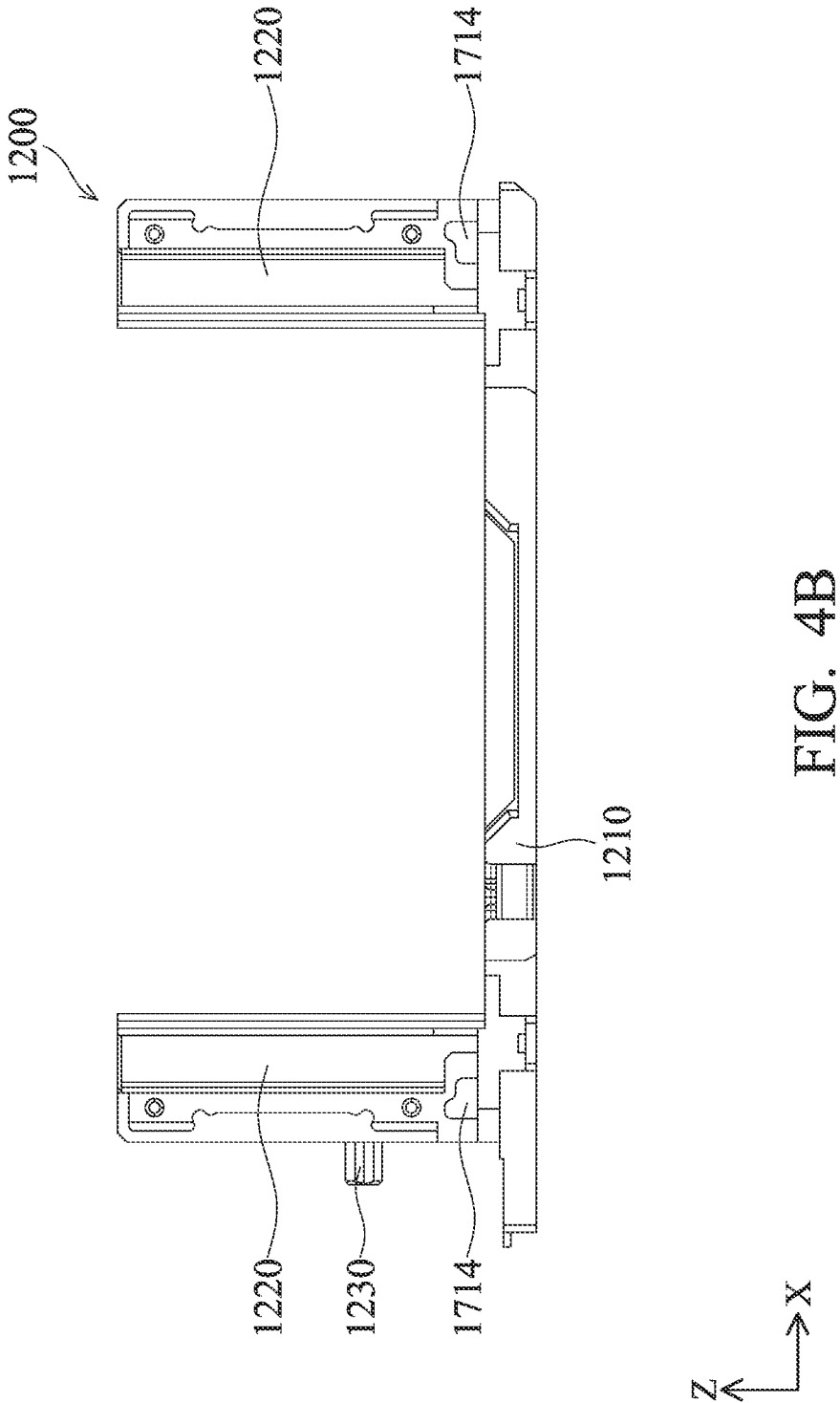
FIG. 4B is a side view of the second assembly.
Figure 5B:
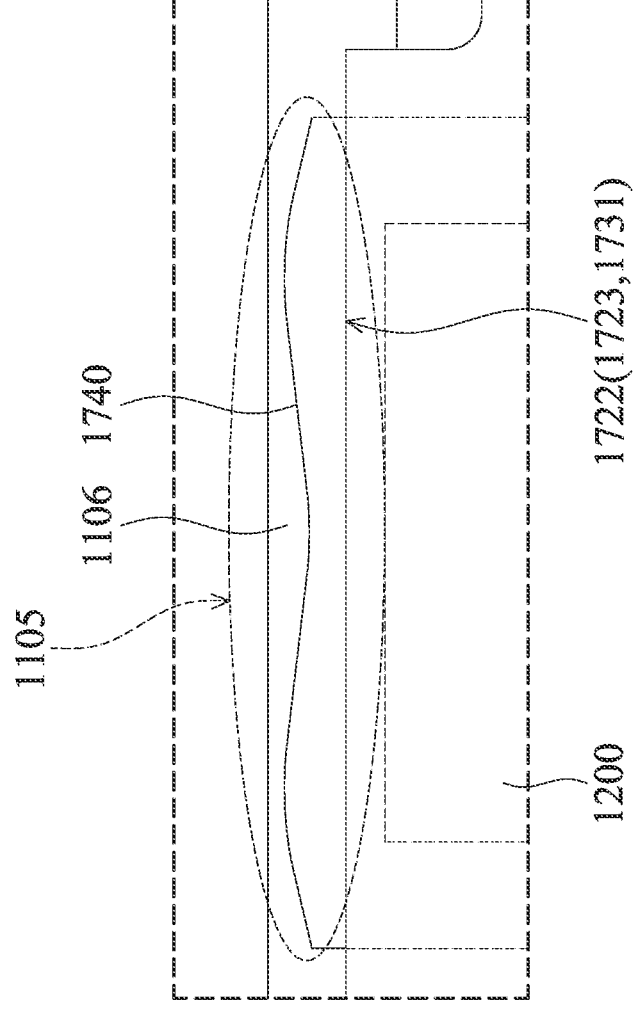
Figure 5B:
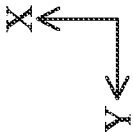
Figure 6:
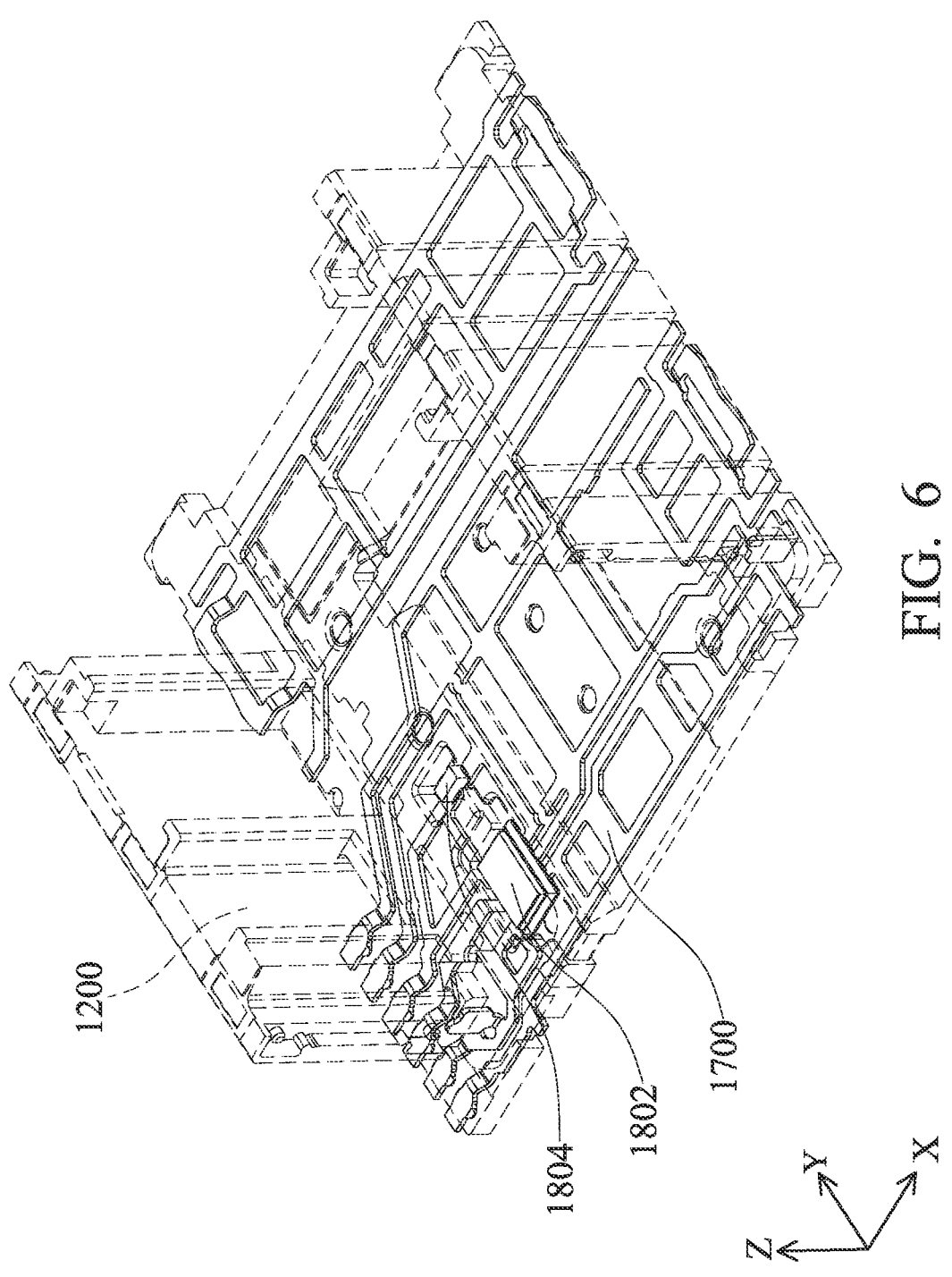
FIG. 6 is a perspective view of the second assembly.
Figure 7A:
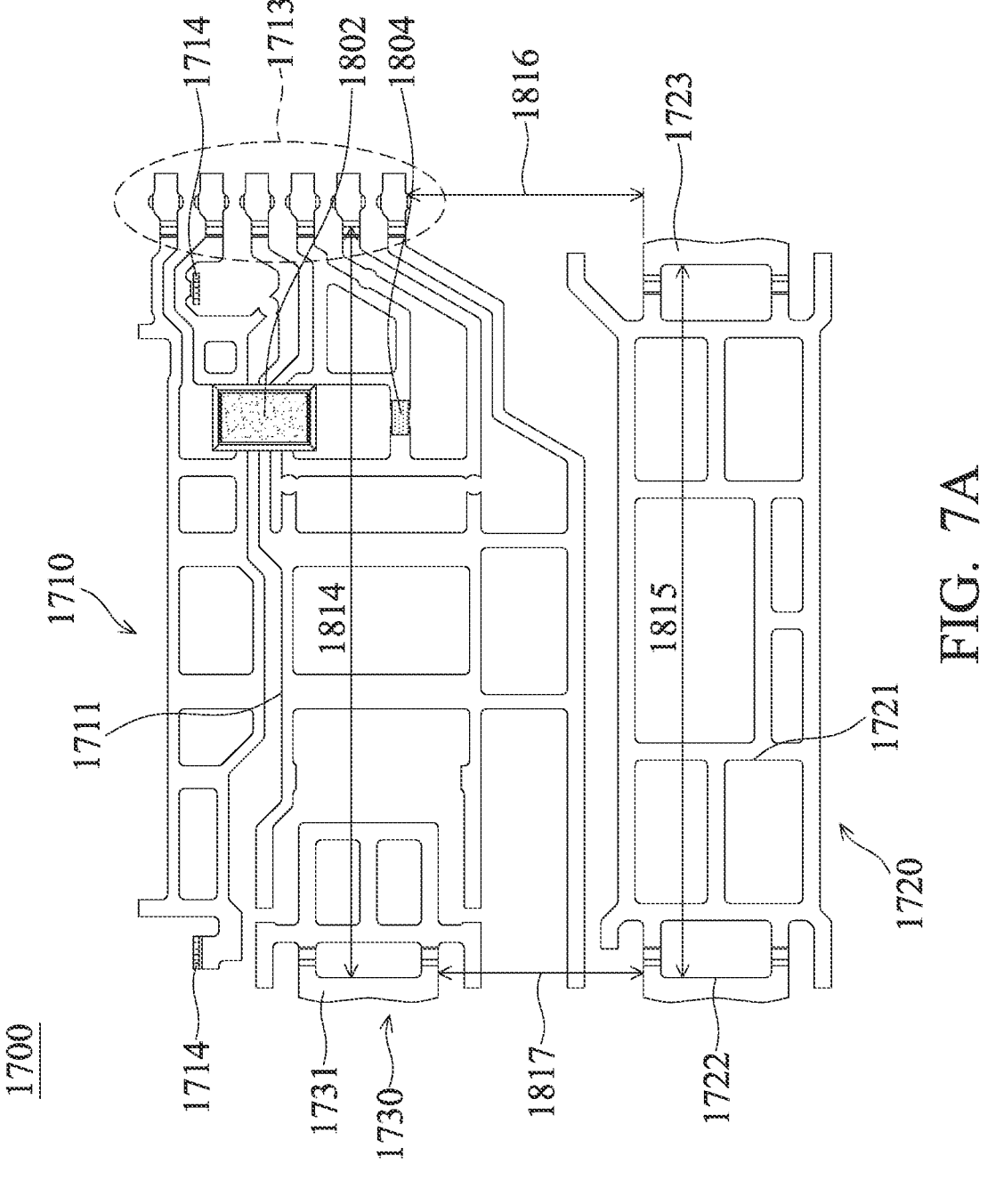
FIG. 7A is a top view of the circuit assembly.
Figure 7B:
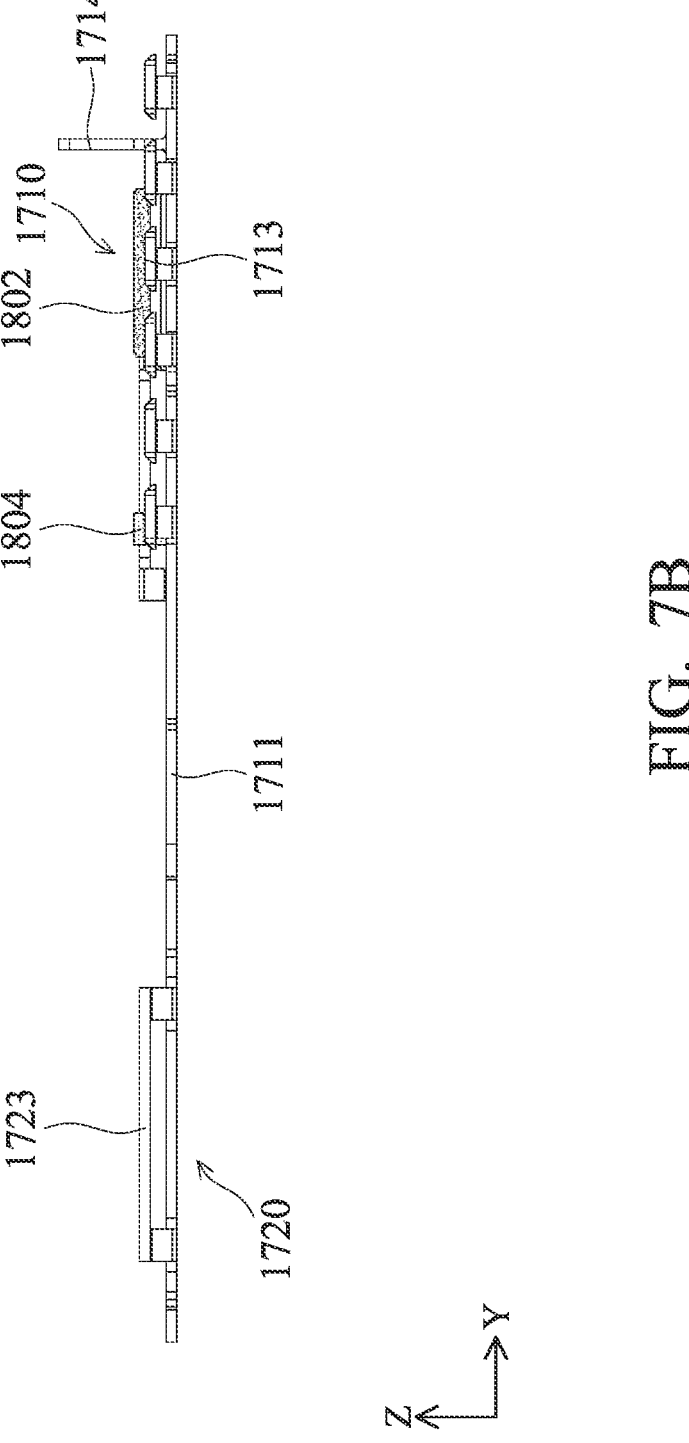
FIG. 7B and FIG. 7C are side views of the circuit assembly viewed in different directions.
Figure 7C:
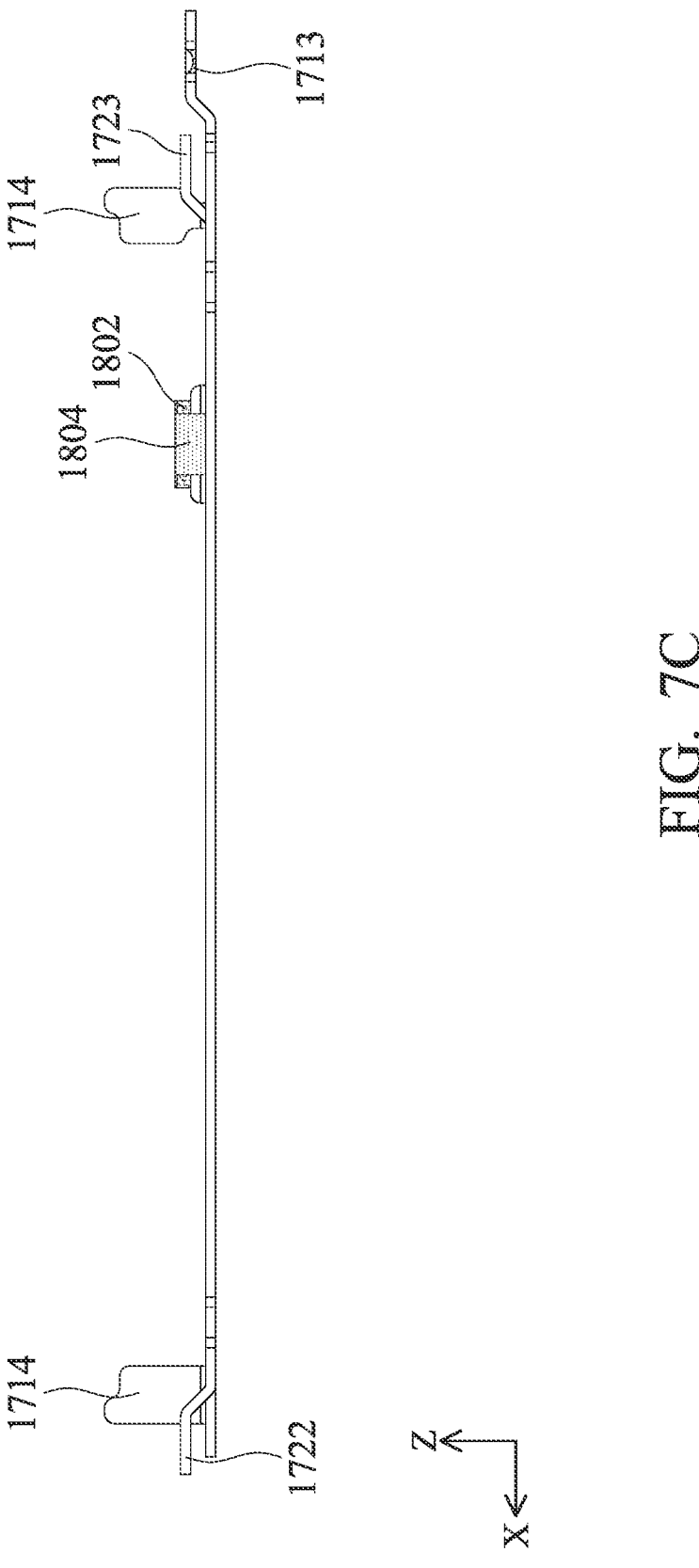
Figure 7D:
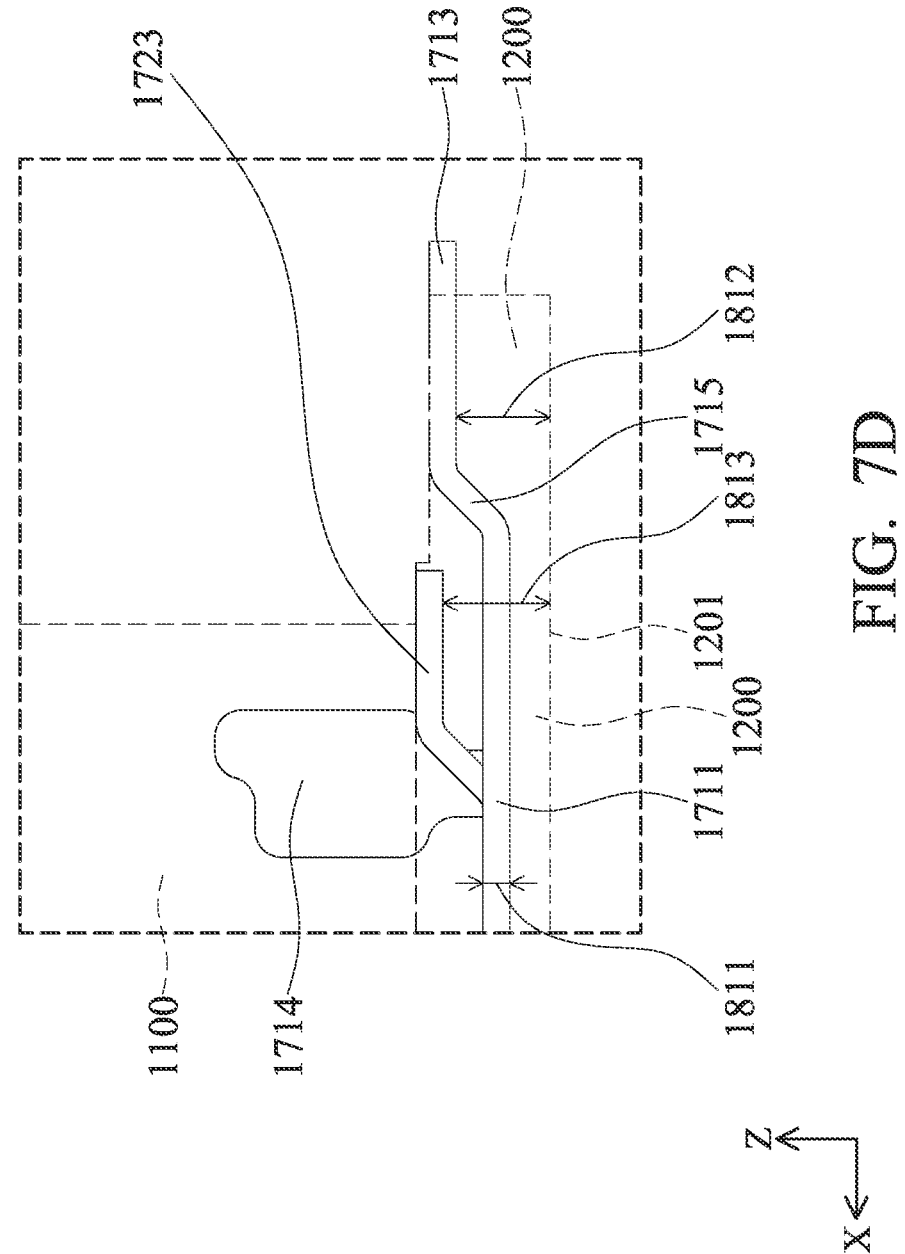
FIG. 7D is an enlarged perspective view of the optical system.

In some elements, the case 1100 may be called as a first assembly, and the bottom 1200 and the circuit assembly 1700 may be called as a second assembly. The second assembly may be affixed on the first assembly. For example, FIG. 4A is a schematic view of the second assembly. FIG. 4B is a side view of the second assembly. FIG. 5A and FIG. 5B are enlarged views of the second assembly viewed in different directions. FIG. 6 is a perspective view of the second assembly. FIG. 7A is a top view of the circuit assembly 1700. FIG. 7B and FIG. 7C are side views of the circuit assembly 1700 viewed in different directions. FIG. 7D is an enlarged perspective view of the optical system 1000.

In some embodiments, the bottom 1200 may include a main body 1210 and a wall 1220, the wall 1220 may extend in the second direction from the main body 1210, and the circuit assembly 1700 may be disposed in the main body 1210 and partially exposed from the main body 1210. In some embodiments, a column 1230 is formed on the wall 1220, and the column 1230 extends in a third direction. When viewed in the first direction or the third direction, the column 1230 is exposed from the case 1100 (the first assembly). Moreover, the case 1100 also includes a recess 1110, and the column 1230 may be disposed in the recess 1110 to control the position of the recess 1110 relative to the bottom 1200. When viewed along the first direction, the column 1230 does not overlap the first connecting portion 1713.

In some embodiments, the circuit assembly 1700 may include a first circuit element 1710, a second circuit element 1720, and a third circuit element 1730. The bottom 1200 may include non-metal material, such as may be electrically isolated. For example, the first circuit element 1710 may include a first main body 1711, a first connecting portion 1713, a second connecting portion 1714, and a bending portion 1715. The first connecting portion 1713 may connect to the first main body 1711 through the bending portion 1715, and the second connecting portion 1714 may connect to the first main body 1711. The second circuit element 1720 may include a second main body 1721, a second welding portion 1722, and a third welding portion 1723, wherein the second welding portion 1722 and the third welding portion 1723 connects to the second main body 1721. The third circuit element 1730 may include a fourth welding portion 1731. The first electronic element 1802 and the second electronic element 1804 may be electrically connected to the first main body 1711 of the first circuit element 1710, and the first circuit element 1710 may be electrically isolated from the second circuit element 1720, the third circuit element 1730, and the case 1100 (the first assembly). The second circuit element 1720 and the third circuit element 1730 may be electrically connected to the case 1100.

In some embodiments, the first connecting portion 1713, the second connecting portion 1714, the second welding portion 1722, the third welding portion 1723, and the fourth welding portion 1731 may be exposed from the bottom 1200. For example, the first connecting portion 1713, the second welding portion 1722, the third welding portion 1723, and the fourth welding portion 1731 may be exposed from the main body 1210, and the second connecting portion 1714 may be disposed on the wall 1220. When viewed in a fourth direction, the second connecting portion 1714 extends in the second direction and may be exposed from the wall 1220 and overlap the wall 1220. When viewed in the first direction, the first connecting portion 1713 may be exposed from the case 1100 (the first assembly) to electrically connect to external circuit.

In some embodiments, the case 1100 (first assembly) may include electrical conductive material (e.g. metal), and may include a first welding portion 1105, such as the portion of the case 1100 in contact with the second welding portion 1722, the third welding portion 1723, and the fourth welding portion 1731. The face of the first welding portion 1105 facing the circuit assembly 1700 may be called as a first welding surface 1106. The first welding portion 1105 may be affixed on the second welding portion 1722, the third welding portion 1723, and the fourth welding portion 1731 by welding (e.g. soldering or laser welding). For example, in some embodiments, the second welding portion 1722 may include a second welding surface 1740, and the first welding surface 1106 and the second welding surface 1740 may be perpendicular to each other. In some embodiments, the welding may be performed at the first welding surface 1106 and the second welding surface 1740, such as providing a solder ball or laser on the first welding surface 1106 and the second welding surface 1740, to affix the case 1100 and the circuit assembly 1700.

In some embodiments, when viewed along from the first direction (−Z direction) that is parallel to the normal vector of the first welding surface 1106, the second welding portion 1722 is not exposed from the case 1100 (the first assembly). When viewed in the second direction (+Z direction) that is opposite from the first direction, the second welding portion 1722 may overlap the case 1100 (the first assembly). Therefore, welding may be performed to the first welding portion 1105 and the second welding portion 1722.

In some embodiments, the second welding portion 1722 and the third welding portion 1723 are arranged in the third direction (X direction), and the second welding portion 1722 and the fourth welding portion 1731 are arranged in the fourth direction (Y direction). The first direction (−Z direction), the second direction (+Z direction), the third direction (X direction), and the fourth direction (Y direction) are different. It should be noted that the second welding surface 1740 may include jagged or wavy shapes, such as may be not parallel or perpendicular to the third direction and the fourth direction. Therefore, when compared with a flat surface, the second welding surface 1740 may include a greater surface area for welding, so the assemble problem caused by tolerance of the elements may be reduced.

In some embodiments, in the Z direction, the first main body 1711 and the bottom surface 1201 of the bottom 1200 may have a first distance 1811, the first connecting portion 1713 and the bottom surface 1201 may have a second distance 1812, and the third welding portion 1723 and the bottom surface 1201 may have a third distance 1813. In some embodiments, the first distance 1811, the second distance 1812, and the third distance 1813 may be different. For example, the first distance 1811 may be less than the second distance 1812 and the third distance 1813, and the second distance 1812 may be less than the third distance 1813. In other words, the first main body 1711, the first connecting portion 1713, and the third welding portion 1723 may position at different heights to further utilize the space in the optical system 1000.

In some embodiments, the bending portion 1715 may be spaced apart from the case 1100 and may be embedded in the bottom 1200 to be electrically isolated from the case 1100 for preventing short circuit. In some embodiments, the first connecting portion 1713 and the fourth welding portion 1731 are arranged in the third direction. In the third direction, the first connecting portion 1713 and the fourth welding portion 1731 has a fourth distance 1814, the second welding portion 1722 and the third welding portion 1723 has a fifth distance 1815, and the fourth distance 1814 and the fifth distance 1815 are different. For example, the fourth distance 1814 may be greater than the fifth distance 1815. Moreover, in some embodiments, in the fourth direction, the first connecting portion 1713 and the third welding portion 1723 has a sixth distance 1816, the second welding portion 1722 and the fourth welding portion 1731 has a seventh distance 1817, and the sixth distance 1816 and the seventh distance 1817 may be different. For example, the sixth distance 1816 may be greater than the seventh distance 1817.

In some embodiments, the first circuit element 1710 may overlap at least a portion of the first electronic element 1802 and the second electronic element 1804 when viewed in the first direction. When viewed in the third direction (X direction), the first connecting portion 1713 may overlap at least a portion of the first electronic element 1802 and the second electronic element 1804, the first electronic element 1802 and the second electronic element 1804 do no overlap each other, and the second welding portion 1722 does not overlap the first electronic element 1802 and the second electronic element 1804. In some embodiments, the first connecting portion 1713 and the second connecting portion 1714 may at least partially overlap each other, and the second connecting portion 1714 does not overlap the third welding portion 1723. Moreover, in some embodiments, when viewed in the fourth direction (the Y direction), the first electronic element 1802 and the second electronic element 1804 may at least partially overlap each other, the first connecting portion 1713 does not overlap the first electronic element 1802, the second electronic element 1804, and the second connecting portion 1714, and the second connecting portion 1714 may at least partially overlap the third welding portion 1723. Therefore, the size of the case 1100 in specific directions may be reduced to achieve miniaturization.

In some embodiments, the materials of the case 1100 and the circuit assembly 1700 may be different, such as may include different metal material. For example, the material of the first welding portion 1105 may be different from the materials of the second welding portion 1722, the third welding portion 1723, and the fourth welding portion 1731, and the materials of the second welding portion 1722, the third welding portion 1723, and the fourth welding portion 1731 may be identical. In some embodiments, a first welding element (not shown) may be provided on the first welding portion 1105 to cover the first welding surface 1106, and a second welding element (not shown) may be provided on the second welding portion 1722 (or the third welding portion 1723 or the fourth welding portion 1731) to cover the second welding surface 1740. In some embodiments, the first welding element and the second welding element may be coatings having materials different from the materials of the first welding portion 1105, the second welding portion 1722, the third welding portion 1723, and the fourth welding portion 1731 for changing the surface properties of the first welding portion 1105, the second welding portion 1722, the third welding portion 1723, and the fourth welding portion 1731 to allow welding, but the present disclosure is not limited thereto. In some embodiments, the first welding element and the second welding may be omitted, depending on design requirement.

Figure 8:
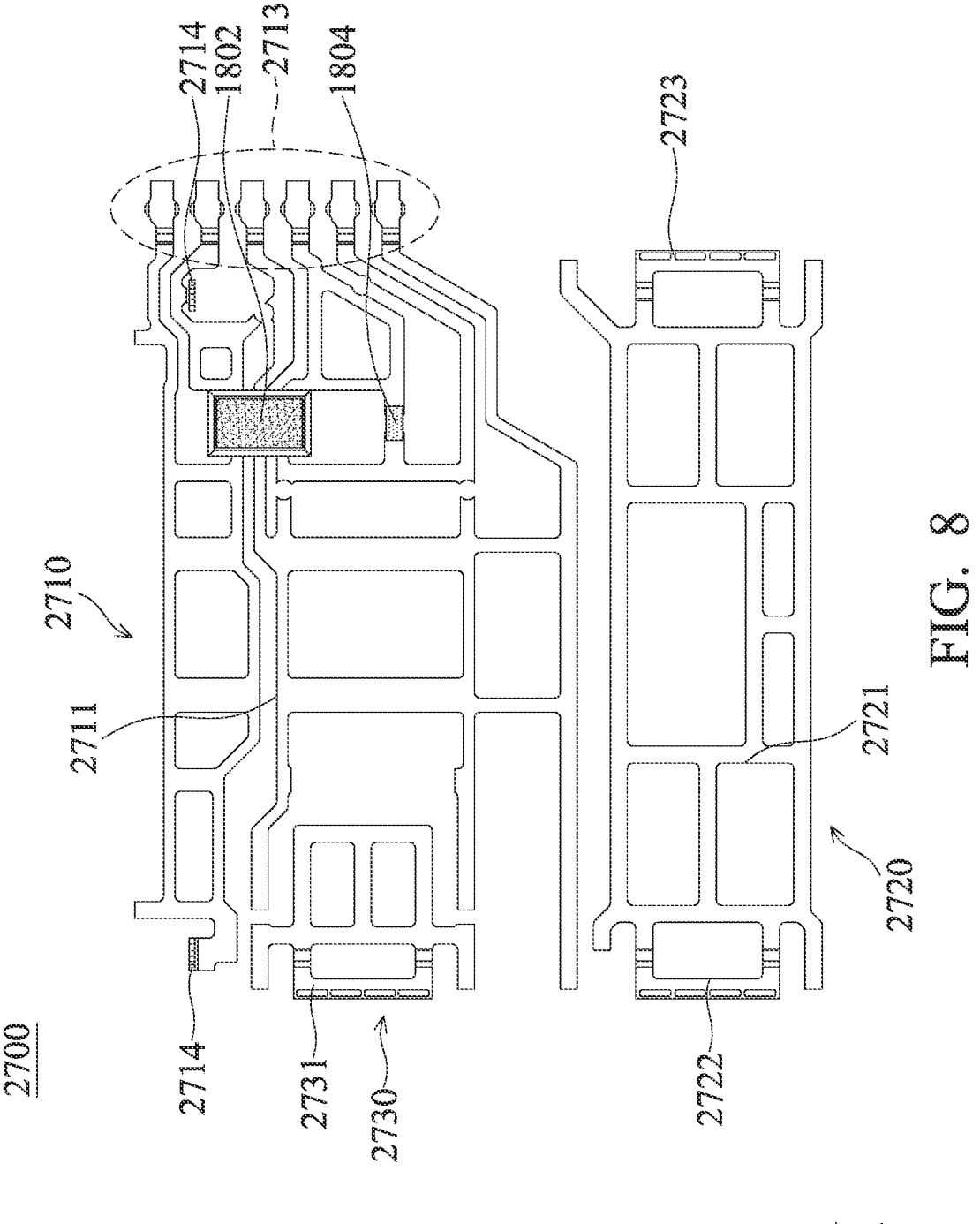
FIG. 8 is a schematic view of a circuit assembly in some embodiments of the present disclosure.

The previous embodiments disclose the second welding portion 1722, the third welding portion 1723, and the fourth welding portion 1731 have the second welding surface 1740 which are jagged or wavy shaped, but the present disclosure is not limited thereto. For example, FIG. 8 is a schematic view of a circuit assembly 2700 in some embodiments of the present disclosure. In some embodiments, the circuit assembly 2700 may include a first circuit element 2710, a second circuit element 2720, and a third circuit element 2730. For example, the first circuit element 2710 may include a first main body 2711, a first connecting portion 2713, a second connecting portion 2714, and a bending portion 2715. The first connecting portion 2713 may connect to the first main body 2711 through the bending portion 2715, and the second connecting portion 2714 may connect to the first main body 2711. The second circuit element 2720 may include a second main body 2721, a second welding portion 2722, and a third welding portion 2723, wherein the second welding portion 2722 and the third welding portion 2723 connects to the second main body 2721. The third circuit element 2730 may include a fourth welding portion 2731. The first electronic element 1802 and the second electronic element 1804 may be electrically connected to the first main body 2711 of the first circuit element 2710, and the first circuit element 2710 may be electrically isolated from the second circuit element 2720, the third circuit element 2730, and the case 1100 (the first assembly). The second circuit element 2720 and the third circuit element 2730 may be electrically connected to the case 1100.

In some embodiments, the first connecting portion 2713, the second connecting portion 2714, the second welding portion 2722, the third welding portion 2723, and the fourth welding portion 2731 may be exposed from the bottom 1200. For example, the first connecting portion 2713, the second welding portion 2722, the third welding portion 2723, and the fourth welding portion 2731 may be exposed from the main body 1210, and the second connecting portion 2714 may be disposed on the wall 1220. When viewed in a fourth direction, the second connecting portion 2714 extends in the second direction and may be exposed from the wall 1220 and overlap the wall 1220. When viewed in the first direction, the first connecting portion 2713 may be exposed from the case 1100 (the first assembly) to electrically connect to external circuit.

Figure 9A:
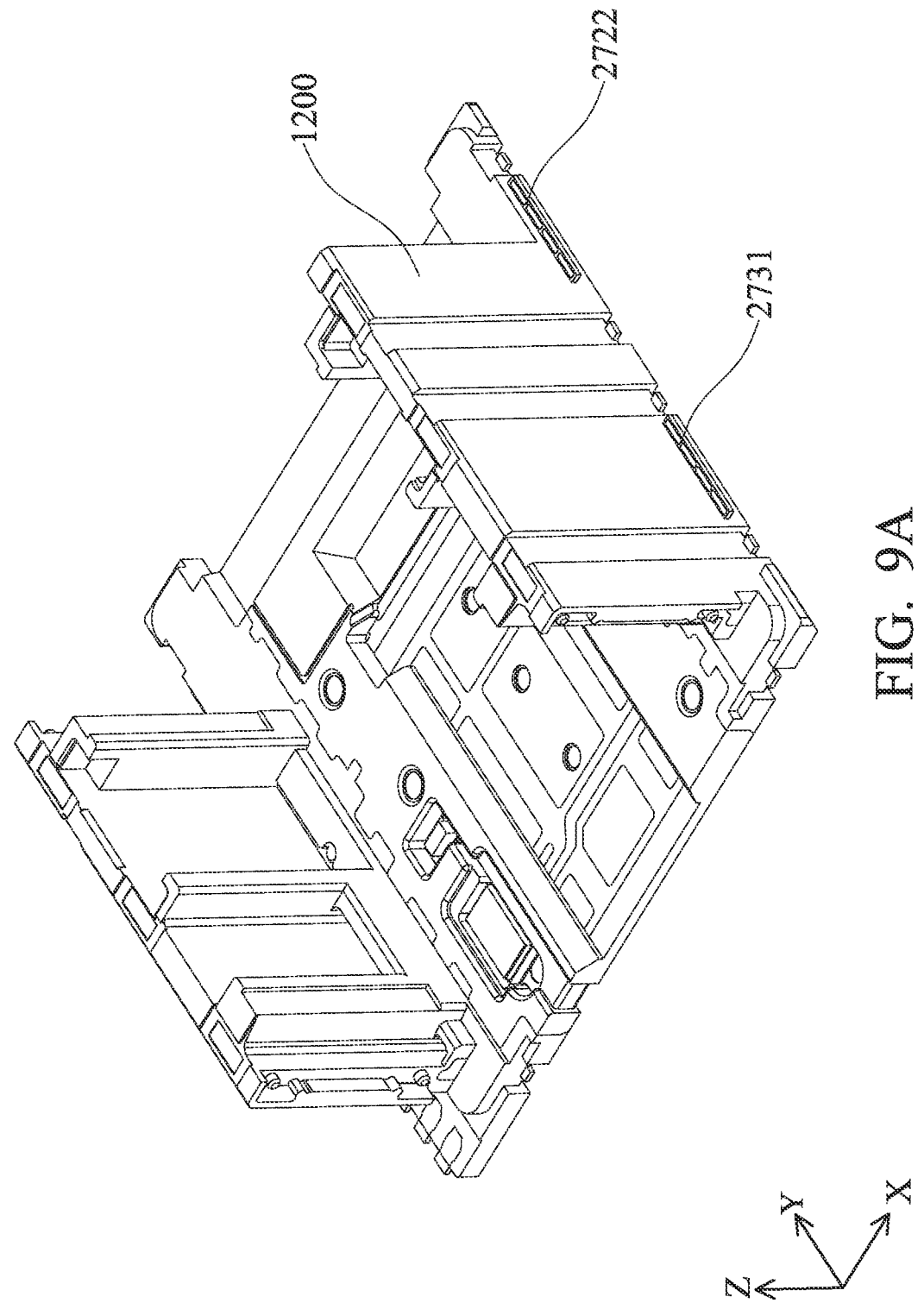
FIG. 9A is a schematic view of the second assembly.
Figure 9B:
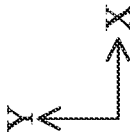
FIG. 9B is a bottom view of the second assembly.
Figure 10A:
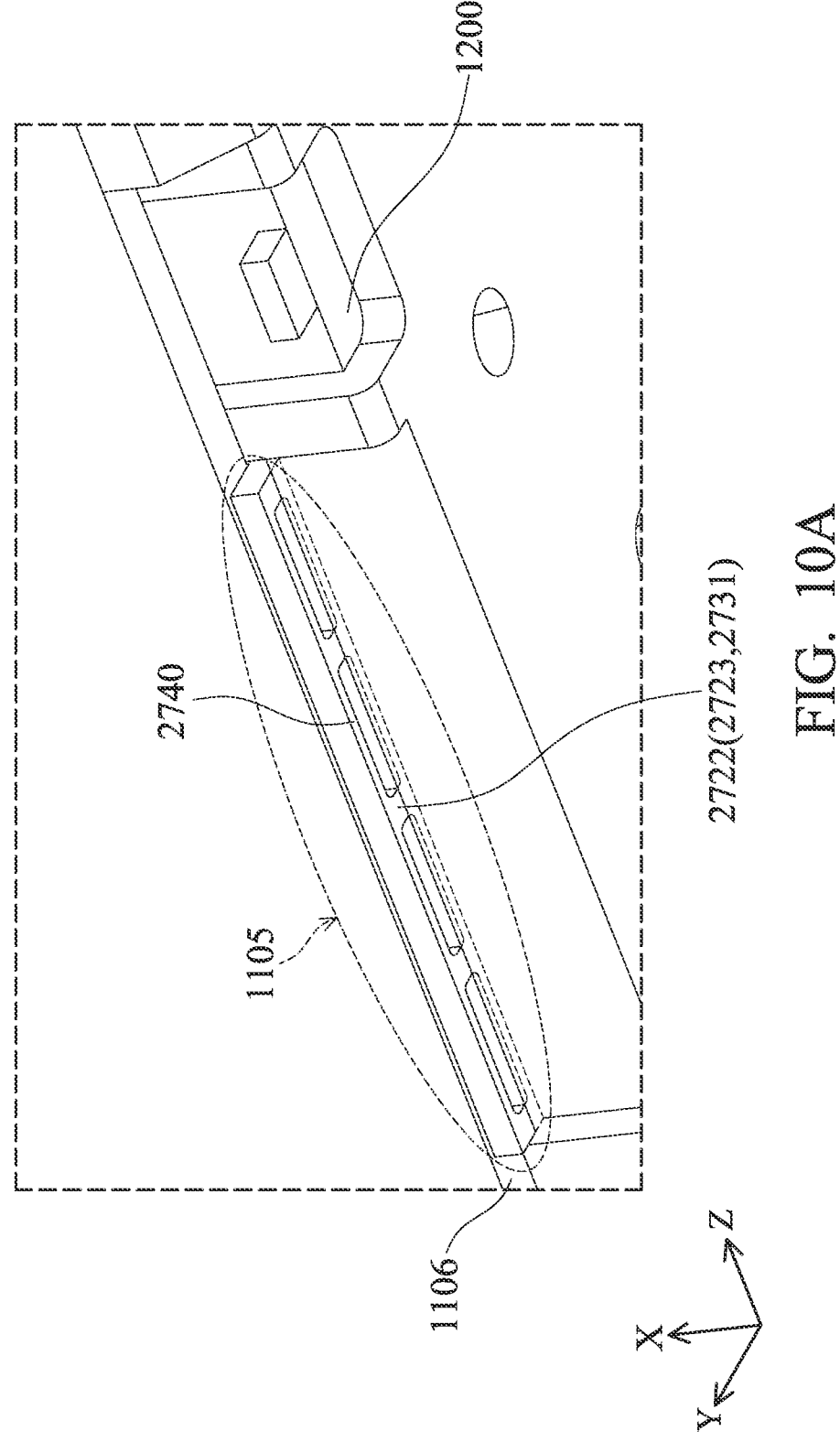
FIG. 10A and FIG. 10B are enlarged views of the second assembly viewed in different directions.
Figure 10B:
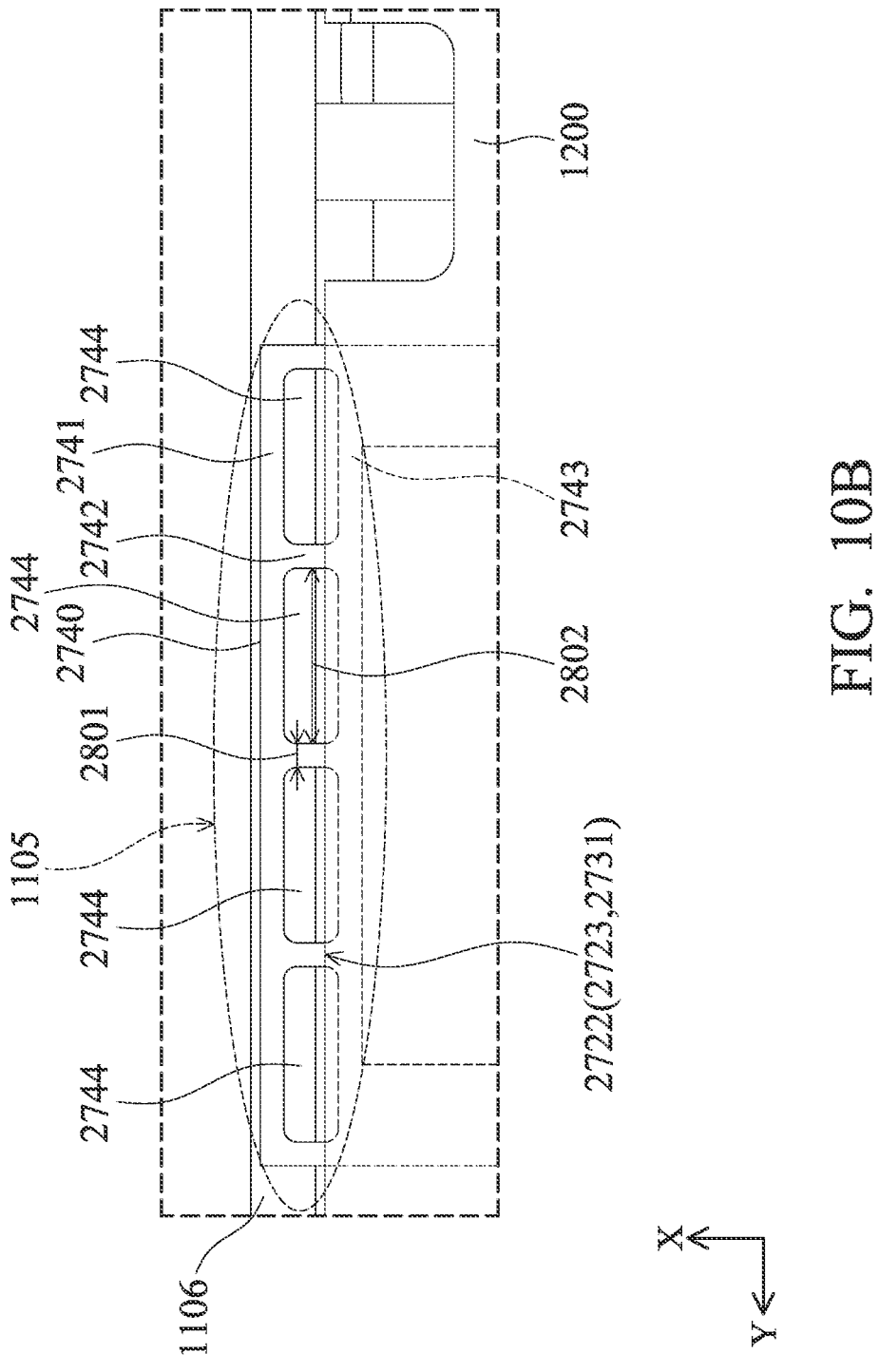

In some embodiments, the circuit assembly 1700 may be substituted by the circuit assembly 2700, and the main difference is that the shapes of the second welding portion 2722, the third welding portion 2723, and the fourth welding portion 2731 may be different from the shapes of the second welding portion 1722, the third welding portion 1723, and the fourth welding portion 1731. For example, the bottom 1200 and the circuit assembly 2700 may be called as the second assembly. FIG. 9A is a schematic view of the second assembly. FIG. 9B is a bottom view of the second assembly. FIG. 10A and FIG. 10B are enlarged views of the second assembly viewed in different directions. In some embodiments, the second welding portion 2722 (or the third welding portion 2723 or the fourth welding portion 2731) may include a first portion 2741, a second portion 2742, a third portion 2743, and a heat isolation structure 2744. The first portion 2741 connects to the third portion 2743 through the second portion 2742, and the heat isolation structure 2744 and the second portion 2742 are arranged in the fourth direction. In some embodiments, when viewed along the second direction, the first portion 2741 is exposed from the bottom 1200, a portion of the second portion 2742 is exposed from the bottom 1200, another portion of the second portion 2742 is embedded in the bottom 1200, and the third portion 2743 is embedded in the bottom 1200.

The heat isolation structure 2744 may be holes. Therefore, when viewed in the second direction, the first welding surface 1106 may be exposed from the heat isolation structure 2744. In the fourth direction, the second portion 2742 has a first width 2801, the heat isolation structure 2744 has a second width 2802, and the first width 2801 and the second width 2802 are different, such as the first width 2801 may be less than the second width 2802, but it is not limited thereto.

Since the second welding surface 2740 is on the first portion 2741, so when welding is performed to the first welding surface 1106 and the second welding surface 2740, the second welding surface 2740 may be a heat source. By providing the heat isolation structure 2744 between the first portion 2741 and the third portion 2743, the speed of the heat transferred from the first portion 2741 through the second portion 2742 to the third portion 2743 may be reduced to prevent other elements affected by heat generated during welding. Moreover, the heat in the welding region may be prevented from dissipated to enhance the efficiency of welding.

Figure 11A:
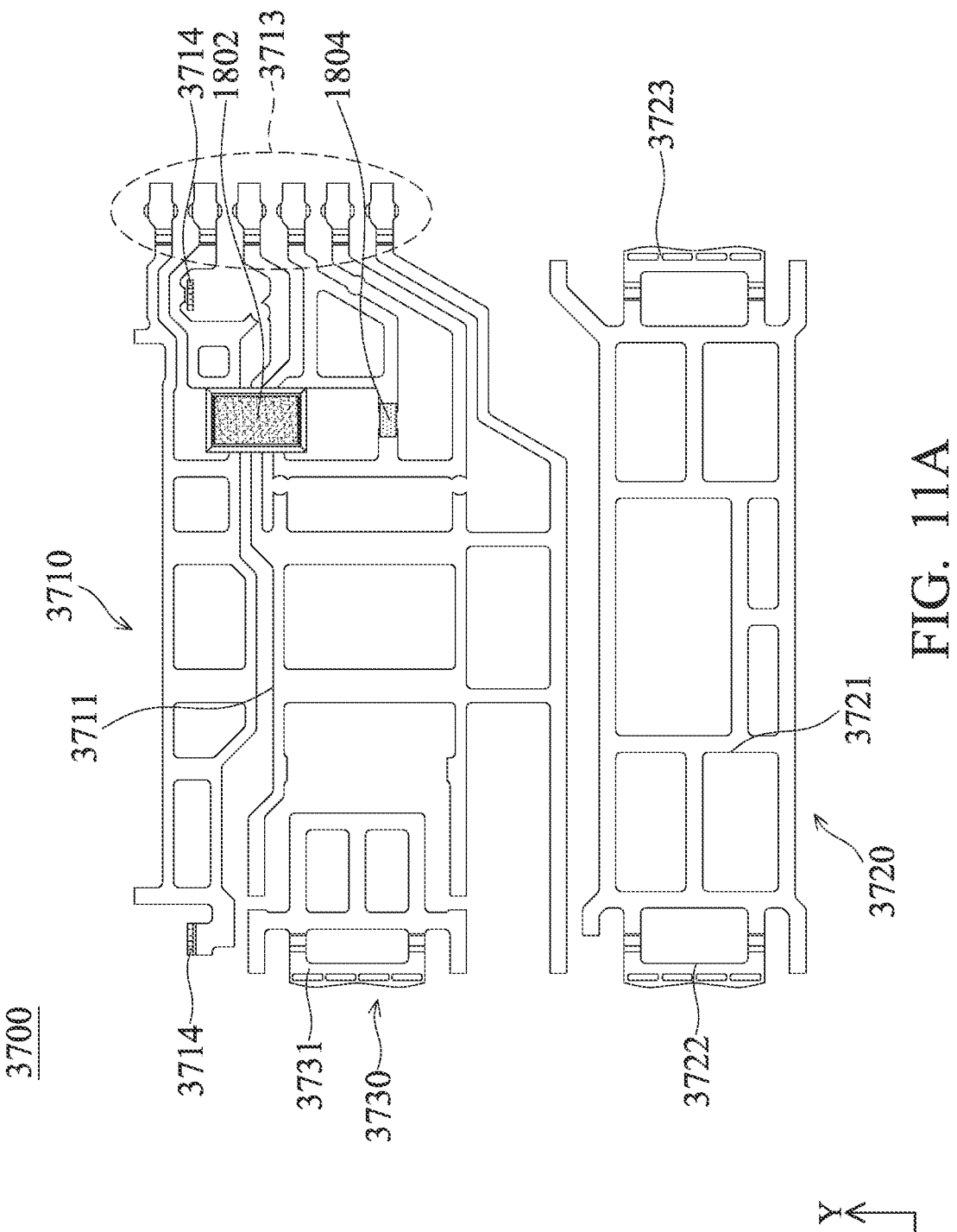
FIG. 11A is a schematic view of a circuit assembly.
Figure 11B:
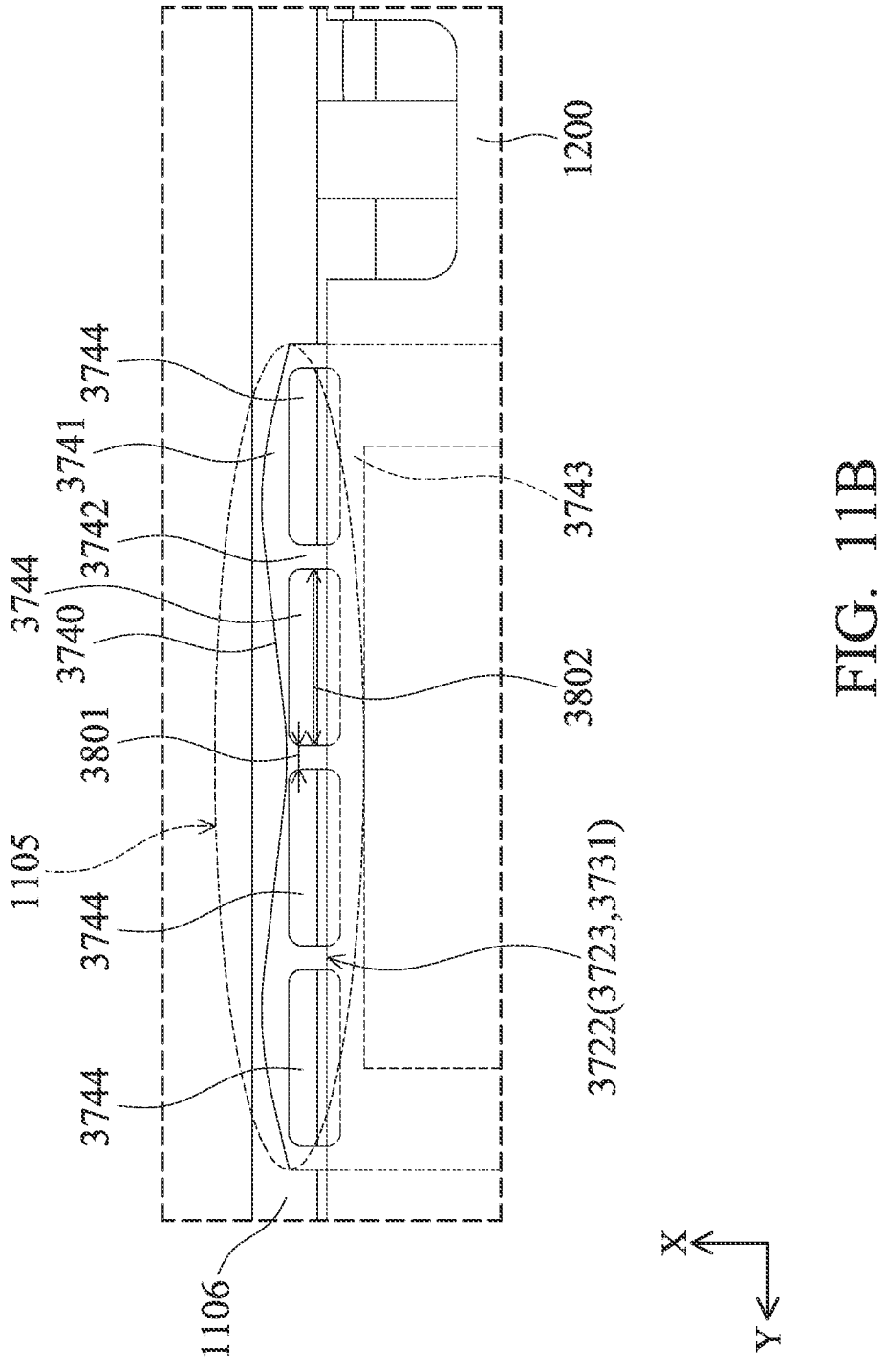
FIG. 11B is an enlarged view of the second assembly using the circuit assembly.

In some embodiments, the wavy second welding surface and the hole-shaped heat isolation structure may be provided at a same time. For example, FIG. 11A is a schematic view of a circuit assembly 3700. FIG. 11B is an enlarged view of the second assembly using the circuit assembly 3700. In some embodiments, the circuit assembly 3700 may include a first circuit element 3710, a second circuit element 3720, and a third circuit element 3730. For example, the first circuit element 3710 may include a first main body 3711, a first connecting portion 3713, a second connecting portion 3714, and a bending portion 3715. The first connecting portion 3713 may connect to the first main body 3711 through the bending portion 3715, and the second connecting portion 3714 may connect to the first main body 3711. The second circuit element 3720 may include a second main body 3721, a second welding portion 3722, and a third welding portion 3723, wherein the second welding portion 3722 and the third welding portion 3723 connects to the second main body 3721. The third circuit element 3730 may include a fourth welding portion 3731. The first electronic element 1802 and the second electronic element 1804 may be electrically connected to the first main body 3711 of the first circuit element 3710, and the first circuit element 3710 may be electrically isolated from the second circuit element 3720, the third circuit element 3730, and the case 1100 (the first assembly). The second circuit element 3720 and the third circuit element 3730 may be electrically connected to the case 1100.

In some embodiments, the first connecting portion 3713, the second connecting portion 3714, the second welding portion 3722, the third welding portion 3723, and the fourth welding portion 3731 may be exposed from the bottom 1200. For example, the first connecting portion 3713, the second welding portion 3722, the third welding portion 3723, and the fourth welding portion 3731 may be exposed from the main body 1210, and the second connecting portion 3714 may be disposed on the wall 1220. When viewed in a fourth direction, the second connecting portion 3714 extends in the second direction and may be exposed from the wall 1220 and overlap the wall 1220. When viewed in the first direction, the first connecting portion 3713 may be exposed from the case 1100 (the first assembly) to electrically connect to external circuit.

In some embodiments, the second welding portion 3722 (or the third welding portion 3723 or the fourth welding portion 3731) may include a first portion 3741, a second portion 3742, a third portion 3743, and a heat isolation structure 3744. The first portion 3741 connects to the third portion 3743 through the second portion 3742, and the heat isolation structure 3744 and the second portion 3742 are arranged in the fourth direction. In some embodiments, when viewed along the second direction, the first portion 3741 is exposed from the bottom 1200, a portion of the second portion 3742 is exposed from the bottom 1200, another portion of the second portion 3742 is embedded in the bottom 1200, and the third portion 3743 is embedded in the bottom 1200.

In some embodiments, the heat isolation structure 3744 may be holes. Therefore, when viewed in the second direction, the first welding surface 1106 may be exposed from the heat isolation structure 3744. In the fourth direction, the second portion 3742 has a first width 3801, the heat isolation structure 3744 has a second width 3802, and the first width 3801 and the second width 3802 are different, such as first width 3801 may be less than the second width 3802, but it is not limited thereto.

In some embodiments, the difference between the circuit assembly 2700 and the circuit assembly 3700 is that the second welding surface 3740 on the first portion 3741 may be wavy shaped, and the second welding surface 2740 may be a flat surface. Therefore, the surface area of the second welding surface 3740 may be further increased, and the heat during the welding may be kept to further increase the efficiency when performing welding to the first welding surface 1106 and the second welding surface 3740.

In summary, an optical system is provided in some embodiments of the present disclosure. The optical system includes a first assembly and a second assembly. The first assembly includes a first welding portion. The second assembly is affixed on the first assembly and includes a second welding portion. The first welding portion is affixed on the second welding portion by welding. Therefore, it is easier to weld the first assembly and the second assembly to reduce assembly problems caused by tolerance, and the efficiency of the welding may be enhanced.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical system, comprising:
   a first assembly comprising a first welding portion, wherein the first welding portion comprises a first welding surface;
   a second assembly affixed on the first assembly and comprising:
      a bottom comprising a first surface, a second surface, and a third surface, wherein the first surface and the second surface face different directions, and the second surface and the third surface face an identical direction;

a circuit assembly disposed in the bottom, comprising:

a first circuit element disposed in the bottom and partially exposed from the first surface;

a second circuit element disposed in the bottom, partially exposed from the second surface, and comprising a second welding portion, wherein the second welding portion comprises a second welding surface perpendicular to the first welding surface; and a third circuit element disposed in the bottom and partially exposed from the third surface;

a movable portion disposed in the first assembly and the second assembly and used for holding an optical element having an optical axis, wherein when viewed along the optical axis, the first assembly does not overlap the second welding portion, and a normal direction of the first welding surface is perpendicular to the optical axis; and wherein the first welding portion is affixed on the second welding portion by welding.

2. The optical system as claimed in claim 1, wherein: the bottom comprises non-metal material.

3. The optical system as claimed in claim 2, wherein:

the first circuit element and the second circuit element are electrically isolated from each other; and the first circuit element and the third circuit element are electrically isolated from each other.

4. The optical system as claimed in claim 3, wherein:

the second welding portion is not exposed from the first assembly when viewed in a first direction parallel to a normal vector of the first welding surface;

the second welding portion overlaps the first assembly when viewed in a second direction opposite from the first direction; and the first circuit element comprises a first main body, a bending portion, and a first connecting portion.

5. The optical system as claimed in claim 4, further comprising a first electronic element and a second electronic element connecting the first main body, wherein:

the first main body connects to the first connecting portion through the bending portion; and the first connecting portion is exposed from the bottom.

6. The optical system as claimed in claim 5, wherein:

the second circuit element further comprises a third welding portion affixed on the first welding portion by welding;

the third circuit element further comprises a fourth welding portion affixed on the first welding portion by welding;

the second welding portion and the third welding portion are arranged in a third direction;

the second welding portion and the fourth welding portion are arranged in a fourth direction;

the third direction and the first direction are different;

the fourth direction and the first direction are different;

the third direction and the fourth direction are different;

the second welding surface is not parallel or perpendicular to the third direction; and the second welding surface is not parallel or perpendicular to the fourth direction.

7. The optical system as claimed in claim 6, wherein:

the first direction and the third direction are perpendicular;

the first direction and the fourth direction are perpendicular;

the third direction and the fourth direction are perpendicular;

the second welding portion comprises a first portion, a second portion, a third portion, and a heat isolation structure;

the first portion connects to the third portion through the second portion;

the second welding surface is at the first portion;

the first portion is exposed from the bottom when viewed in the second direction;

a portion of the second portion is exposed from the bottom when viewed in the second direction; and another portion of the second portion is embedded in the bottom when viewed in the second direction.

8. The optical system as claimed in claim 7, wherein:

the third portion is embedded in the bottom when viewed in the second direction;

the heat isolation structure and the second portion are arranged in the fourth direction;

the first welding surface is exposed form the heat isolation structure when viewed in the second direction;

the second portion has a first width in the fourth direction;

the heat isolation structure has a second width in the fourth direction; and the first width and the second width are different.

9. The optical system as claimed in claim 8, wherein:

the first width is less than the second width;

a first distance is between the first main body and a bottom surface of the bottom in the first direction;

a second distance is between the first connecting portion and the bottom surface in the first direction;

a third distance is between the third welding portion and the bottom surface in the first direction;

the first distance and the second distance are different;

the first distance and the third distance are different; and the second distance and the third distance are different.

10. The optical system as claimed in claim 9, wherein:

the first assembly further comprises a case, wherein the first welding portion is a portion of the case;

the bending portion is separated from the case; and the bending portion is embedded in the bottom.

11. The optical system as claimed in claim 10, wherein:

the first connecting portion and the fourth welding portion are arranged in the third direction;

a fourth distance is between the first connecting portion and the fourth welding portion in the third direction;

a fifth distance is between the second welding portion and the third welding portion in the third direction; and the fourth distance and the fifth distance are different.

12. The optical system as claimed in claim 11, wherein:

a sixth distance is between the first connecting portion and the third welding portion in the fourth direction;

a seventh distance is between the second welding portion and the fourth welding portion in the fourth direction; and the sixth distance and the seventh distance are different.

13. The optical system as claimed in claim 12, wherein:

the first distance is less than the second distance;

the first distance is less than the third distance;

the second distance is less than the third distance;

the fourth distance is greater than the fifth distance; and the sixth distance is greater than the seventh distance.

14. The optical system as claimed in claim 13, wherein:

the bottom comprises a main body and a wall;

the wall extends from the main body in the second direction;

the circuit assembly is disposed in the main body;

a column is formed on the wall and extending in the third direction;

the column is exposed from the first assembly when viewed in the first direction; and the column is exposed from the first assembly when viewed in the third direction.

15. The optical system as claimed in claim 14, wherein:

the case further comprises a recess;

the column is disposed in the recess;

the first connecting portion is exposed from the first assembly when viewed in the first direction; and the column does not overlap the first connecting portion viewed in the first direction.

16. The optical system as claimed in claim 15, wherein:

the first circuit element is electrically isolated from the first assembly;

the first circuit element further comprises a second connecting portion disposed on the wall;

the second connecting portion is exposed from the wall and overlaps the wall when viewed in the fourth direction; and the second connecting portion extends in the second direction.

17. The optical system as claimed in claim 16, wherein:

at least a portion of the first circuit element overlaps the first electronic element when viewed in the first direction;

at least a portion of the first circuit element overlaps the second electronic element when viewed in the first direction;

at least a portion of the first connecting portion overlaps the first electronic element when viewed in the third direction;

at least a portion of the first connecting portion overlaps the second electronic element when viewed in the third direction;

the first electronic element and the second electronic element do not overlap each other when viewed in the third direction;

the third welding portion does not overlap the first electronic element and the second electronic element when viewed in the third direction;

at least a portion of the first connecting portion overlaps the second connecting portion when viewed in the third direction; and the second connecting portion and the third welding portion do not overlap each other when viewed in the third direction.

18. The optical system as claimed in claim 17, wherein:

at least a portion of the first electronic element overlaps the second electronic element when viewed in the fourth direction;

the first connecting portion does not overlap the first electronic element when viewed in the fourth direction;

the first connecting portion does not overlap the second electronic element when viewed in the fourth direction;

the first connecting portion and the second connecting portion do not overlap each other when viewed in the fourth direction;

at least a portion of the second connecting portion overlaps the third welding portion when viewed in the fourth direction;

materials of the first welding portion and the second welding portion are different;

the optical system further comprises:

a first welding element covering the first welding surface;

a second welding element covering the second welding surface;

a driving assembly disposed on the movable portion and the fixed portion, used for driving the movable portion to move relative to the fixed portion; and a resilient assembly elastically connecting to the movable portion and the fixed portion;

wherein materials of the first welding element and the first welding portion are different;

materials of the second welding element and the second welding portion are different;

the first assembly and the second assembly form a fixed portion; and the movable portion is movable relative to the fixed portion.

19. The optical system as claimed in claim 1, wherein:

the bottom further comprises a fourth surface, a fifth surface, and a sixth surface;

the first circuit element is partially exposed from the fourth surface;

the second circuit element is partially exposed from the fifth surface;

the third circuit element is partially exposed from the sixth surface;

the second surface and the fifth surface face opposite directions;

the fourth surface is perpendicular to the first surface, the second surface, and the fifth surface; and the fifth surface and the sixth surface face an identical direction.

20. The optical system as claimed in claim 1, wherein:

the first circuit element, the second circuit element, and the third circuit element are physically separated from each other;

in a third direction, the first circuit element partially overlaps the second circuit element and the third circuit element; and in the third direction, the second circuit element does not overlap the third circuit element.

\* \* \* \* \*